United States Patent [19]
Bechtel et al.

[11] Patent Number: 4,917,477
[45] Date of Patent: Apr. 17, 1990

[54] AUTOMATIC REARVIEW MIRROR SYSTEM FOR AUTOMOTIVE VEHICLES

[75] Inventors: Jon H. Bechtel; Harlan J. Byker, both of Holland, Mich.

[73] Assignee: Gentex Corporation, Zeeland, Mich.

[21] Appl. No.: 34,913

[22] Filed: Apr. 6, 1987

[51] Int. Cl.⁴ .............................................. G02F 1/17
[52] U.S. Cl. .................... 350/357; 350/283; 350/279
[58] Field of Search ............... 350/357, 278, 279, 281, 350/283

[56] References Cited

U.S. PATENT DOCUMENTS

| | | | |
|---|---|---|---|
| 4,443,057 | 4/1984 | Bauer et al. | 350/281 |
| 4,669,825 | 6/1987 | Itoh et al. | 350/278 |
| 4,690,508 | 9/1987 | Jacob | 350/283 X |
| 4,750,816 | 6/1988 | Ito et al. | 350/357 |

Primary Examiner—Eugene R. LaRoche
Assistant Examiner—Nathan W. McCutcheon
Attorney, Agent, or Firm—Malcolm R. McKinnon

[57] ABSTRACT

An improved automatic rearview mirror system which is particularly adapted for use with automotive vehicles and which may be utilized as a fully integrated inside/outside rearview mirror system or as an inside or an outside rearview mirror system. The system includes a variable reflectance member the reflectivity of which varies as a function of an electrical signal applied thereto, and the system also includes improved means operable to apply an electrical signal to the variable reflectance member to vary the reflectivity of such member as a function of sensed ambient light and sensed glare causing light.

44 Claims, 12 Drawing Sheets

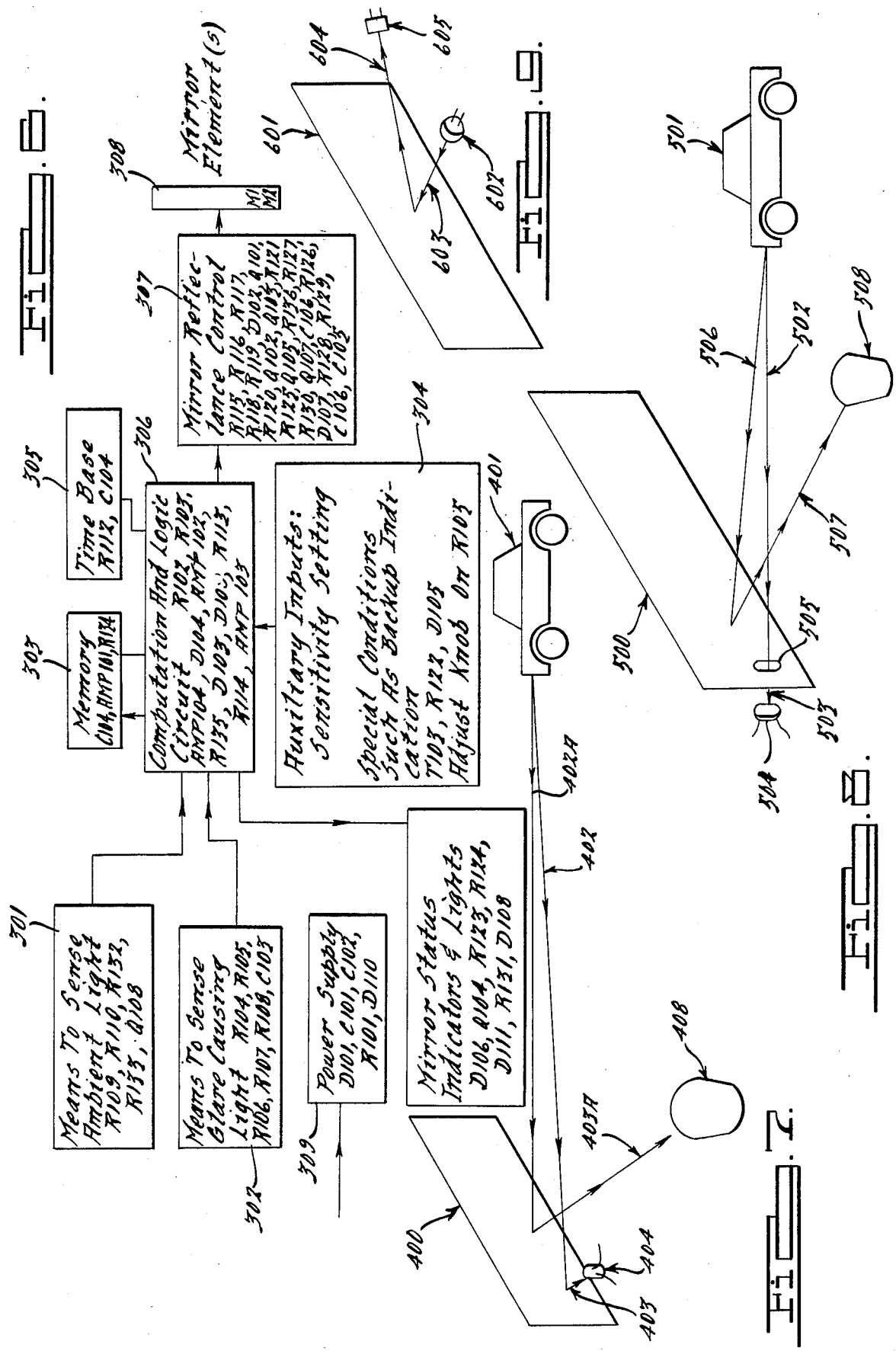

AUTOMATIC REARVIEW MIRROR SYSTEM FOR AUTOMOTIVE VEHICLES

BRIEF SUMMARY OF THE INVENTION

This invention relates to rearview mirrors for automotive vehicles and, more particularly, to an improved automatic rearview mirror system for automotive vehicles.

Heretofore, many automatic rearview mirrors for automotive vehicles have been devised which automatically transfer from the full reflectance mode (day) to the partial reflectance mode (night) for glare protection purposes from light emanating from the headlights of vehicles approaching from the rear. Such automatic rearview mirrors have become increasingly sophisticated over the years, and the automatic rearview mirror for automotive vehicles disclosed in U.S. Pat. No. 4,443,057, issued Apr. 17, 1984, for Automatic Rearview Mirror for Automotive Vehicles, and assigned to the assignee of the present invention, is typical of such sophisticated automatic rearview mirrors. An improved electronic control system for automatic rearview mirrors is disclosed in U.S. Pat. No. 4,580,875, issued Apr. 8, 1986, for Electronic Control System for Automatic Rearview Mirrors for Automatic Vehicles, such last mentioned patent also being assigned to the assignee of the present invention. The present invention provides an improved automatic rearview mirror system for automotive vehicles, such system incorporating improved means for overcoming deficiencies in prior automatic rearview mirrors of the indicated character. It will also be understood, however, that the present invention is also applicable to other uses.

In general, the automatic rearview mirrors disclosed in U.S. Pat. Nos. 4,443,057 and 4,580,875 utilize a prism type reflective element which is substantially identical to the prism type reflective elements utilized in manually (hand) operated day-night mirrors conventionally provided on modern day automobiles. The automatic rearview mirrors disclosed in said prior patents automatically respond to annoying glare from the rear of the vehicle and automatically shift to the partial or low reflectance mode. After the source of the annoying glare is removed, the automatic rearview mirrors return to the full or high reflectance mode without requiring any action on the part of the driver of the vehicle during any portion of the cycle, the power required being drawn either from the vehicle's electrical system or from a self contained battery.

As previously mentioned, in the past, many automatic mirrors have been devised for the purpose of automatically shifting the reflective element incorporated therein between the full reflectance and partial reflectance modes. However, proper control of an automatic rearview mirror is a complex task, and there has been a progression in the prior art. With respect to the means for sensing glare conditions, in early attempts to make automatic rearview mirrors, a single rear facing sensor was utilized. Such sensor sensed the glare producing light level impinging on the mirror from the rear, and such mirrors locked in the nonglare position during the day and required constant readjustment to prevent latch up or undesirably high sensitivity as the driver encountered brighter lights in city or town driving. As a first improvement, a second sensor was added to sense the ambient light level and to hold the mirror in a normal position during the day. In most of the control circuits for such two sensor mirrors, the sensitivity of the mirror was reduced as ambient light levels approached daylight levels until the ambient light reached a level above which the mirror remained in the nonglare position. This feature was refined so that the sensitivity of the mirror was referenced to the instantaneous ambient light level during nighttime driving. However, both ambient and glare producing light levels are quite erratic since headlight beams which are momentarily blocked or which suddenly sweep into position cause erratic glare. Moreover, streetlamps, lighted roadside signs, and headlights of oncoming vehicles are erratic sources of ambient light. Thus, mirror operation of such prior art mirrors remained erratic in the face of these conditions. Moreover, the problem was compounded by making the glare threshold dependent on the erratic instantaneous light level. In an effort to overcome such problems, attempts were made to introduce time delays and to filter the combined ambient and glare producing light levels. However, none of these minor improvements to the prior art mirrors resulted in a commercially successful product since the added nuisance effects of the second sensor more than offset its advantages with the result that the two-sensor circuits were often less desirable than the single-sensor circuits.

The first commercially successful automatic rearview mirror for automotive vehicles was disclosed in U.S. Pat. No. 4,443,057. The automatic mirror disclosed in U.S. Pat. No. 4,443,057 constituted a major advance in the utilization of ambient light level and the electrical control circuitry for such mirror included forward sensor filtering means characterized by having a long time response and having a smoothing time averaged effect on the forward electrical signal generated by the forward facing sensor means and indicative of the forward light level. The long, smoothed time average of the ambient light level, rather than the ambient light level itself, was then compared with the glare producing light level to determine the glare threshold of the mirror. Use of the long, smoothed time average of the ambient light level, instead of the instantaneous ambient light level, reduced and all but eliminated the effect of the erratic fluctuation of the ambient light level. A second important benefit of this long, smoothed time average is that it responds to ambient light level in much the same way as the human eye responds. In addition, in the automatic rearview mirror disclosed in U.S. Pat. No. 4,443,057, a shorter time average, which does not prevent rapid response of the mirror to strong glare, is optionally applied to the glare producing light level measurement. This shorter time average may be applied independently to the measurement of the glare producing light level or it may be applied to some combination of the long, smoothed time average of the ambient light level measurement and the glare producing light level measurement, the reason for this option being that the effect of another short time average on the long, smoothed average of the ambient light is minimal. The short time average applied so as to include the glare producing light level is not nearly as beneficial to mirror performance as the long, smoothed time average which is applied to the ambient light level. It is therefore an optional feature of the circuitry disclosed in U.S. Pat. No. 4,443,057. The main benefit of the short time average of the signal which includes the glare producing light level is that it prevents some nuisance actuations of the mirror from outside lights and the like. The commercial product which utilizes the long, smoothed average of the ambient light level also has a day detect circuit which inhibits traverse of the mirror to the nonglare position whenever the instantaneous light level exceeds a predetermined value. However, operation of this feature is independent of the glare producing light level. As previously mentioned, the use of the long, smoothed time average of the ambient light level resulted in a commercially successful product, the mechanical structure and the electronic circuitry of such product being disclosed in U.S. Pat. No. 4,443,057. The electronic control system disclosed in U.S. Pat. No. 4,580,875 constituted an improvement over the circuitry disclosed in U.S. Pat. No. 4,443,057.

Automatic rearview mirrors with the long, smoothed time average of the ambient light level measurement adapt well to varied driving conditions and have very desirable performance in most highway and small town driving situations. In light traffic situations, it is desirable for the mirror to transverse to the nonglare position even when glare only causes mild discomfort. First, glare is most annoying and disabling when ambient light levels are low and when brighter lights from other vehicles are frequently encountered. Second, in light traffic, it is not normally necessary for the driver to see as much detail in the mirror as in heavy traffic. The view provided by the mirror in either the normal position or in the nonglare position is usually satisfactory. Consequently, the mirror preferably should be in the more comfortable nonglare position whenever there is glare. Accordingly, such a mirror performs very well in nearly all light traffic conditions. However, in spite of the generally excellent performance of the mirror just described, it may become too active or too sensitive in some situations, particularly in heavy traffic situations. In heavy traffic situations there are a number of reasons for reducing the sensitivity of the mirror below the level normally programmed for the prevailing time averaged ambient light level. First, the ambient light level is not highly correlated with traffic density. Bright streetlights are the source of the highest ambient light level which is normally encountered in night driving. A lightly traveled but brightly lighted street has a high ambient light level. A heavily traveled but dimly lighted street has a moderate ambient light level.

Second, the added visibility, particularly the greatly added depth perception which normally accompanies the brighter image, is needed by the driver. Third, the driver is exposed to enough brighter lights from headlamps and perhaps from streetlamps that glare is not so annoying or disabling. Fourth, more than one set of headlights are often visible in the mirror at the same time. The driver tends to be bothered by the brightest lights while the mirror sensor measures the combined light level of light striking the mirror from angles that are generally in the driver's field of view. The effect is to increase the apparent sensitivity of the mirror when several sets of headlights contribute to the glare. Fifth, heavy traffic and a few other conditions such as winding or hilly roads, are usually accompanied by very erratic sources of glare. Automobiles change lanes and make turns, and since only strong glare is normally a problem, an automobile may only momentarily be close enough for the glare to be a problem. The result is that the mirror is often undesirably active in very heavy traffic conditions.

U.S. Pat. No. 4,580,875 disclosed means for improving the performance of automatic rearview mirrors so that in the great majority of driving situations, including heavy traffic situations, the sensitivity if maintained at an adequately low level and the mirror is not allowed to become too active. Thus, the improved electronic control system disclosed in U.S. Pat. No. 4,580,875 reduced the sensitivity of the mirror when a driver encountered a situation which requires better visibility or reduced activity of the mirror; monitored fluctuations in, and the values of, the measured light levels so as to approximately indicate conditions where traffic is heavy or where the mirror would normally be overly active; and reduced the sensitivity of the mirror to a value which is lower than the sensitivity would normally be. The glare threshold was thus determined as a function of the ambient light level, of a long, smoothed time average of the ambient light level, of a short, smoothed time average of the glare producing light level, and of the recent activity of the mirror.

The mirrors disclosed in U.S. Pat. Nos. 4,443,057 and 4,580,875 change reflectance by automatically indexing a two position prism mirror element between its high and its low reflectance positions. While the two position prism mirror performs well as an inside rearview mirror there are technical limitations which completely exclude its use as an outside mirror. The utilization of the two position prism in an inside automatic mirror is also subject to deficiencies because of the noise and mechanical vibration associated with the automatic indexing mechanism. Motors, solenoids and the like used to index such a mirror are normally noisy and the pivots and the added weight of the indexing mechanism make it difficult to keep the mirror from vibrating. Furthermore, the two position prism is strictly a dual reflectance device which allows no option for a continuously variable reflectance or for intermediate reflectance states. Experience with mirror elements which have controlled intermediate reflectance levels quickly reveals that a dual reflectance mirror is highly inadequate.

Improvements have been made with liquid crystal type mirrors but limitations still remain. For example, most liquid crystal mirrors reflect less than half as much light as do the two position prism mirrors when the mirrors are in their bright states. The dim images of most liquid crystal mirrors are only three to five times dimmer than their bright images. In comparison, the dim images of two position prism mirrors are approximately twenty times dimmer than their bright images. At low temperatures, most liquid crystal mirrors do not dim properly because most freeze and cloud so as to be totally unusable until they thaw. Furthermore, circuit or power failures cause most liquid crystal mirrors to go to the dim state creating a safety hazard. With respect to other known prior art devices, prior electrochromic devices have performed relatively well but have suffered from limited cycle life, from extremely slow speed in changing reflectance, and from failure of the mirror control circuit to properly utilize the slower speed of mirror operation.

The automatically indexed two position prism mirror referred to above changes from dim to bright or from bright to dim in about one third of a second. Under most driving conditions, the light levels sensed by the mirror are quite erratic. If the transitions of the mirror were not limited in some way, there would be many driving conditions where the mirror would change almost continuously between its dim and bright states. This constant changing would be annoying and disorienting to the driver thereby making the mirror almost unusable and at the same time pose a serious safety problem. In order to avoid the annoying frequent transitions, the two position mirror delays for about eight seconds after the glare subsides before returning from the dim, nonglare position to the normal, bright position. Thus, any complete cycle of the mirror includes a minimum of eight seconds in the dim, nonglare position. This minimum dwell time in the nonglare position limits the rate at which the mirror can transverse between its two states, and this delay feature requires the incorporation of additional components in the circuit. Moreover, the delay circuit alone does not adequately limit transitions of the mirror and the additional stabilizing circuit of U.S. Pat. No. 4,580,875 is also preferably used in the control circuit for the two position prism mirror.

The electrochromic mirror disclosed in the copending application of Harlan J. Byker, Ser. No. 846,354, filed Mar. 31, 1986, for Single-Compartment, Self-Erasing, Solution-Phase Electrochromic Devices, Solutions For Use Therein, and Uses Thereof, and assigned to the assignee of the present invention, overcomes many of the limitations stated above for the two position prism and liquid crystal mirrors and has an excellent cycle life and relatively rapid response in going from the bright to the dim state. Accordingly, electrochromic mirrors of the type disclosed in copending application Ser. No. 846,354 are incorporated in the preferred embodiments of the present invention. Such electrochromic mirrors dim substantially in one to three seconds and clear substantially in five to ten seconds under the control of the control circuits embodying the present invention which enable the electrochromic mirrors to be successfully utilized in an automotive vehicle glare control system. It will be understood, however, that many of the control circuit features are also applicable to the control of other types of mirrors.

An object of the present invention is to overcome disadvantages in prior automatic rearview mirrors of the indicated character and to provide an improved automatic rearview mirror system for automotive vehicles, which system may be utilized as a fully integrated inside/outside rearview mirror system or as an inside or an outside rearview mirror system and which incorporates improved means preventing the abrupt and erratic changes in reflectance levels which are associated with most prior variable reflectance mirrors.

Another object of the present invention is to provide an improved automatic rearview mirror system incorporating improved control circuitry whereby continuous change in the reflectivity of the mirror provides continuously variable reflectance for various embodiments of the invention.

Another object of the present invention is to provide an improved automatic rearview mirror system for automotive vehicles which minimizes glare that the vehicle driver sees under various driving conditions while keeping the reflectivity of the mirror sufficiently high to maintain good visibility.

Another object of the present invention is to provide an improved automatic rearview mirror system for automotive vehicles wherein glare is sensed after attenuation in the mirror thereby improving the accuracy of the reflectance control and reducing the range of glare causing light level signals to which the system must respond.

Another object of the present invention is to provide an improved automatic rearview mirror system for automotive vehicles incorporating improved means which allow the glare causing light threshold to be increased more rapidly with increases in the ambient light reference level.

Another object of the present invention is to provide an improved automatic rearview mirror system for automotive vehicles incorporating an electrochromic mirror effective to dramatically reduce glare from following headlights thereby improving nighttime driving safety and comfort.

Another object of the present invention is to provide an improved automatic rearview mirror system for automotive vehicles which eliminates mirror movement and vibrations and which may gradually darken in multiple increments as opposed to a two-step process.

Still another object of the present invention is to provide an improved automatic rearview mirror system for automotive vehicles wherein the amount of dimming of the mirror depends upon the amount of glare the driver experiences.

Yet another object of the present invention is to provide an improved automatic rearview mirror system for automotive vehicles wherein both the inside and the outside rearview mirrors change reflectance modes simultaneously.

The above as well as other objects and advantages of the present invention will become apparent from the following description, the appended claims and the accompanying drawings.

BRIEF DESCRIPTION OF THE DRAWINGS

FIG. 6 is a simplified, generalized block diagram of the system as illustrated in FIG. 10, and showing the components incorporated in various sections of the system;

FIG. 7 is a schematic diagram of another embodiment of the invention;

FIG. 8 is a schematic diagram of another embodiment of the invention;

FIG. 9 is a schematic diagram of another embodiment of the invention;

FIG. 16 is a plot similar to FIG. 15 except that the threshold point 1204A is somewhat different than the corresponding threshold point 1104A of FIG. 15.

DETAILED DESCRIPTION

In general, in automatic rearview mirror systems embodying the present invention, both the inside and the outside rearview mirrors are comprised of a thin chemical layer sandwiched between two glass elements. As the chemical layer is electrically energized, it darkens and begins to absorb light. The higher the voltage, the darker the mirror becomes. When the electrical voltage is removed, the mirror returns to its clear state. Automatic rearview mirror systems embodying the present invention also incorporate light sensing electronic circuitry which is effective to switch the mirrors to the nighttime mode when glare is detected. However, there is no glass movement, and the change is more subtle than the changes in conventional prism type mirrors. In systems embodying the present invention, the sandwiched chemical layer is activated when glare is detected thereby darkening the mirror automatically. As glare subsides, the mirror glass returns to its normal clear state without any action being required on the part of the driver. In automatic rearview mirror systems embodying the invention, the mirror darkens in continuous fashion as opposed to convention two-step changes in the reflectance mode of conventional rearview mirrors. In systems embodying the present invention, reflectance changes from approximately 85 percent reflectance down to approximately 6 percent reflectance, the amount of dimming depending on how much glare the driver experiences. With only a little glare, the mirror dims only partially while with bright blinding glare, the mirror dims to a fully dark condition. The middle range, or comfort zone, is a 20 percent to 30 percent reflectance level that eliminates the most common glare encountered under normal driving conditions while still providing maximum rear vision. Moreover, if desired, in system embodying the present invention, both the inside and outside rearview mirrors darken simultaneously.

Figure 1:
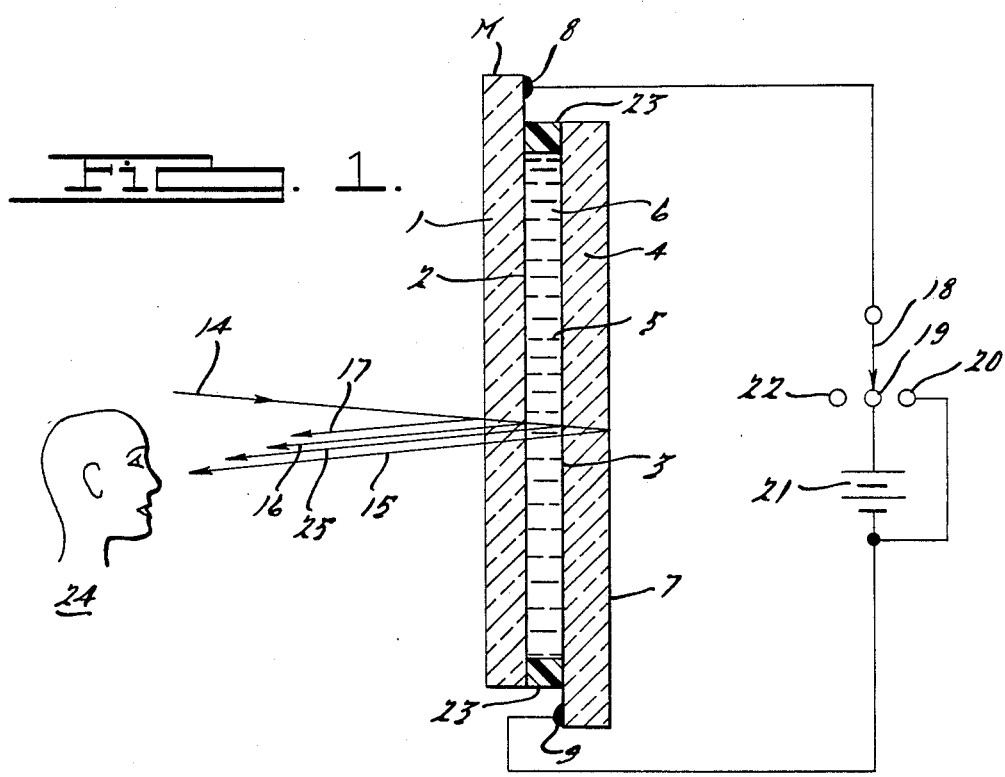
FIG. 1 is a simplified cross-sectional elevational view of an electrochromic mirror, showing the same in position for viewing by the driver of an automotive vehicle.

Referring to the drawings, an electrochromic mirror M is depicted in simplified cross-section in FIG. 1, such mirror being of the type disclosed in the aforementioned copending application Ser. No. 846,354. Since some of the layers of the mirror M are very thin, the scale has been distorted for pictorial clarity. As shown in FIG. 1, a sealed chamber 6 is defined by a clear front glass 1, and edge seal 23, and a rear mirror 4 having a reflective layer 7. A substance 5 having the desired electrochromic properties fills the chamber 6, and transparent conductive layers 2 and 3 are connected to an electrical circuit at terminal points 8 and 9. The light ray 14 enters through the front cover glass 1, the transparent conductive layer 2, the electrochromic layer 5, the transparent conductive layer 3, and the mirror glass 4 layer before being reflected from the reflective layer 7 provided on the mirror glass layer 4. Light in the reflected ray 15 exits by the same general path trasversed in the reverse direction. Both the ray 14 and the reflected ray 15 are attenuated in proportion to the degree to which the electrochromic layer 5 is light absorbing. When the layer 5 is highly light absorbing, the intensity of the ray 15 and the ray 25 are insignificant and the dim image remaining is from rays 16 and 17 which are reflected off of the front and back surfaces of the cover glass 1.

In operation, when the switch 18 is positioned to contact the contact 19 to connect the battery 21 to the terminals 8 and 9, as schematically illustrated in FIG. 1, the mirror darkens in approximately three seconds. When the switch 18 is positioned to contact the contact 22 to open circuit the mirror, the mirror clears in approximately 20 seconds. Because of this property, all of the embodiments of the invention go to their maximum reflectances when power is interrupted. When the mirror is darkened and the switch 18 is positioned to contact the contact 20 thereby shorting the mirror, the mirror clears in approximately 8 seconds. Clearing and darkening begin almost immediately when the drive signal to the mirror element is changed so that significant changes in mirror reflectance occur in times which are much shorter than those stated above.

Figure 1A:
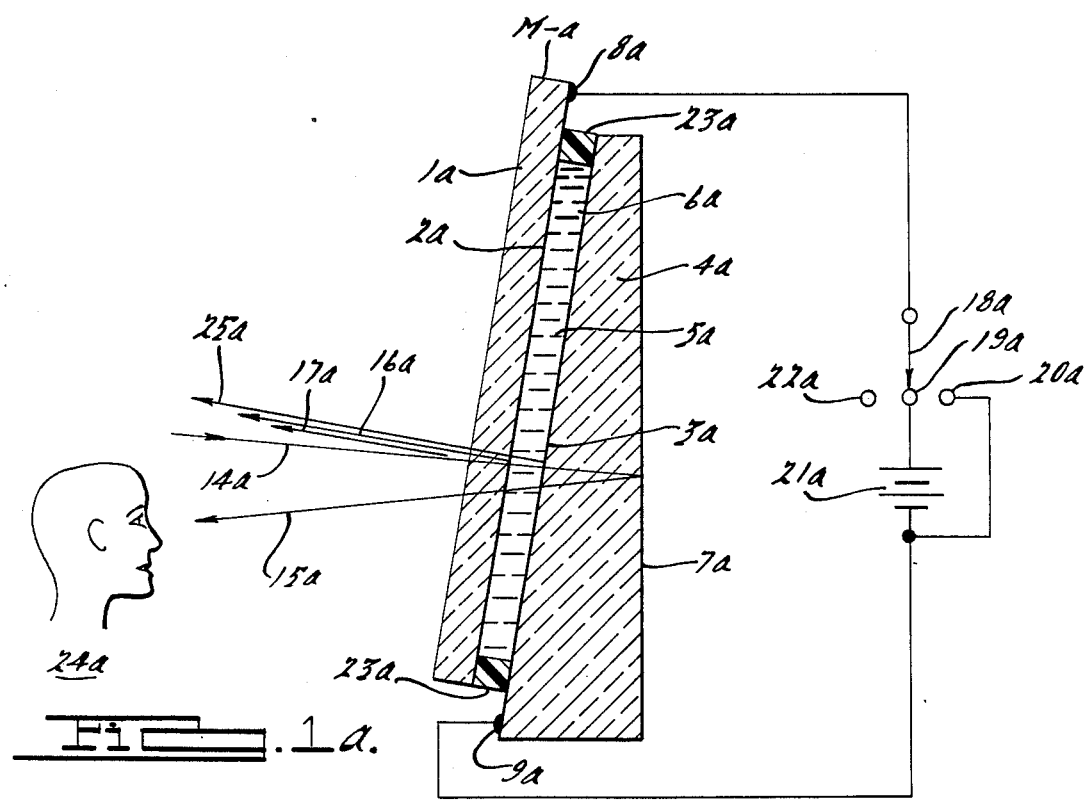
FIG. 1a is an elevational view of a prism type electrochromic mirror similar to the mirror illustrated in FIG. 1, showing the same in position for viewing by the driver of an automotive vehicle.

In FIG. 1, the vehicle driver 24 views the rays 15, 16, 17 and 25 which are reflected from different surfaces of the mirror structure. When the mirror structure is thin and when the layers are parallel, this causes very little problem. However, with wider separation of the surfaces and with slightly nonparallel surfaces, the multiple imaging becomes a problem. In order to eliminate this multiple imaging problem, the prism structure of FIG. 1a is optionally used, such prism structure being disclosed in the aforementioned copending application, Ser. No. 846,354. The structure of the prism mirror M-a of FIG. 1a is identical to that of the mirror M of FIG. 1 except for the prism shape of the element 4a. The angle of the prism is preferably great enough to allow the rays 16a, 17a and 25a to be reflected up toward the roof of the automobile instead of toward the driver. Only the ray 15a reaches the driver 24a. The light ray 14a makes one pass through the attenuating layer 5a before being reflected by the reflective layer 7a as a ray 15a. The light ray 15a then makes a pass through the attenuating layer 5a before being viewed by the driver 24a. Since the rays 16a, 17a and 25a are directed away from the driver, the ray 15a is the only light viewed by the driver. It should be noted that the light in the ray 15a has made two passes through the attenuating electrochromic layer 5a. In operation, when the switch 18a is positioned to contact the contact 19a to connect the battery 21a to the terminals 8a and 9a, as schematically illustrated in FIG. 1a, the mirror darkens. When the switch 18a is positioned to contact the contact 22a to open circuit the mirror M-a, the mirror clears. When the mirror M-a is darkened and the switch 18a is positioned to contact the contact 20a thereby shorting the mirror, the mirror clears. Clearing and darkening begin almost immediately when the drive signal to the mirror element is changed. This mirror structure has a response similar to that assumed for calculations which are made and described hereinafter in greater detail.

Figure 10:
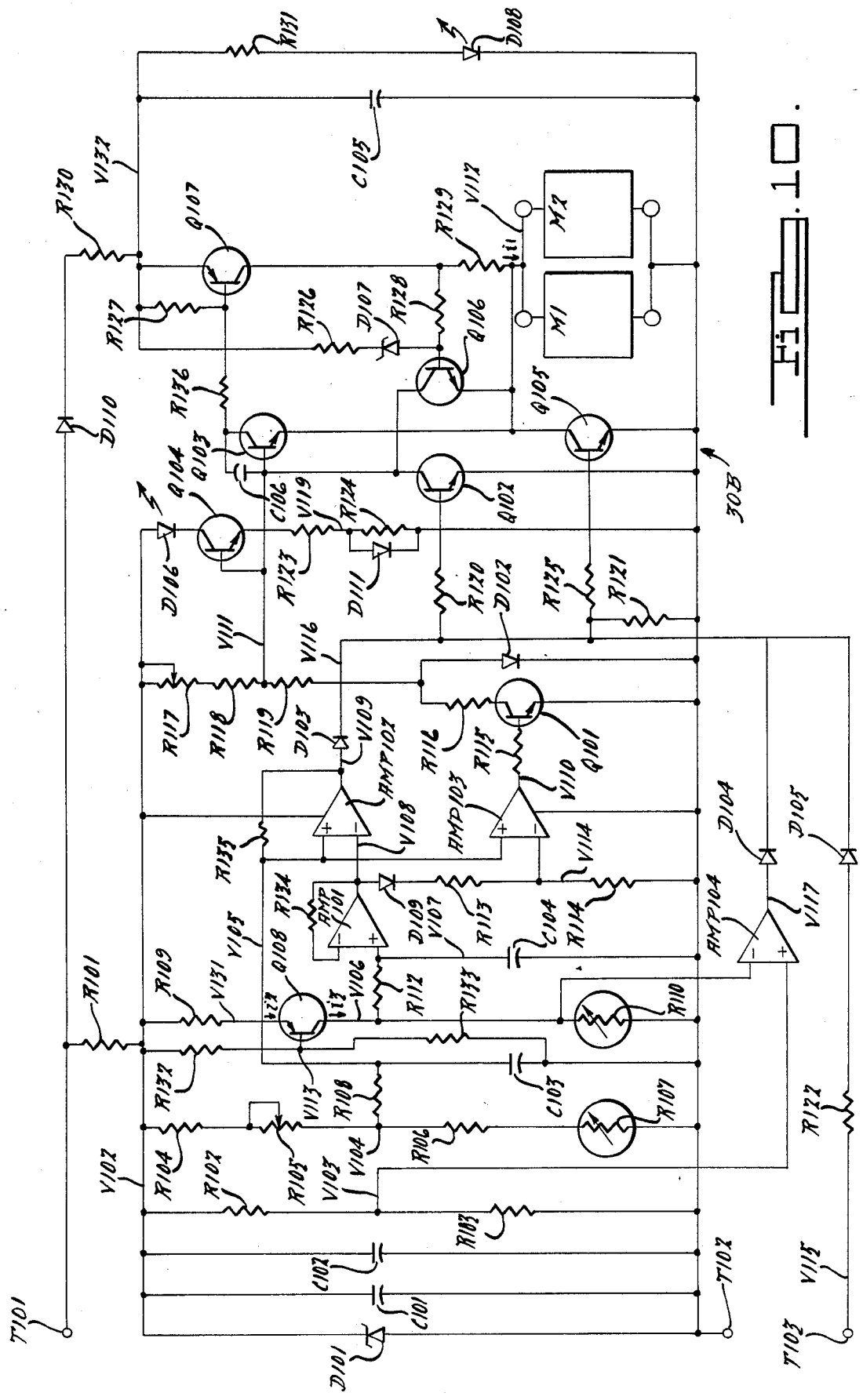
FIG. 10 is a schematic electrical diagram of another embodiment of the invention.

Before specifics of preferred embodiments of the invention are described in detail, the desirable properties of the system will be outlined. FIG. 6 is a simplified, generalized block diagram of a mirror control circuit. For purposes of example associated components from the system illustrated in FIG. 10 are listed with each block. The circuit of FIG. 10 will be described hereinafter in greater detail. Such system includes means to sense the ambient light 301 which is comprises of one or more sensors that are arranged to detect the ambient light level which the driver sees and to which is or her eyes must adjust. The system of FIG. 10 also includes means to sense glare causing light 302 which senses the level of the light that causes glare in the mirror or mirrors which are controlled by the system. In various embodiments of the invention, this sensing is done before, during, or after the light which causes the glare is attenuated by a variable reflectance mirror or similar variable reflectance or variable transmission element which is controlled by the system. The advantages of sensing glare after it has been attenuated will be described hereinafter in greater detail. The means to sense glare causing light includes one or more sensors, and a memory unit 303 is provided which is utilized to register or record a time dependent history of light levels. This history is normally utilized in the establishment of an ambient light reference level which is related to, but preferably more stable than, the signal from 301 which is indicative of the ambient light level. This ambient light reference level is preferably a moving weighted time average of the ambient light signal from 301. Furthermore, the time average is preferably chosen so that the response of the ambient light reference level to changing light conditions approximates the response of the driver's eyes and his or her sensitivity to glare. It should be noted that the averaging effect of the electrochromic mirror on input signals and its inherently smooth transitions in reflectivity make stabilization of the mirror control signals generally less critical than with other mirror implementations. If desired, alternate embodiments of this invention may use the ambient light signal with little or no processing as the ambient light reference. The time average, although desirable, is not absolutely required. The ambient light reference level is used to determine the level of the glare causing light which will be perceived as glare by the driver and to control the mirror(s) to minimize this glare. In an analog implementation, the memory function is normally performed by one or more capacitors. In a microcomputer based implementation, the memory function may be performed by using a semi-conductor memory. A time base 305 is also used in establishing the ambient light reference signal. In an analog implementation, the time base is normally established by one or more capacitor-resistor time constants. In a microcomputer implementation, the time base is normally derived from an oscillator either directly via a counter or indirectly via the resultant program execution time. The control circuit normally responds in a prescribed manner to one or more auxiliary inputs 304. These inputs may be from controls and special condition indicators such as a sensitivity adjustment means, a manual override switch, or an input signal which indicates that the automobile is in reverse gear. The computation and logic circuit 306, which may optionally include or utilize a microcomputer, determines the desired reflectance level of the mirror or mirrors 308 based in inputs from blocks 301 through 305. When not overridden by an auxiliary input, the control circuit 306 utilizes the ambient light reference level, the glare causing light level, and the input from the sensitivity adjustment means to estimate the level of glare to which the driver is subjected. The control circuit 306 then utilizes the above information to determine the desired reflectance level or the desired adjustment thereto and outputs a command signal to circuit 307 which controls the reflectance of mirror of mirrors 308. The objective of the control is to reduce the mirror reflectance to a level which minimizes annoying or disabling glare while allowing the driver maximum visibility in the mirror(s). The reflectance of the mirror or mirrors 308 may be controlled by a variable voltage, a variable current, a variable charge accumulation, a time-proportioned pulse, a variable frequency, or any combination of outputs to the mirrors which achieves the desired reflectance level. The control of reflectance of the mirrors may be open loop or may include a feedback circuit which monitors the actual reflectance of the mirror(s) and then modifies the output signal to achieve the desired reflectance. In most open loop reflectance controls, temperature compensation is required to minimize the effect of ambient temperature on the reflectivity of the mirror. The simplified block diagram in FIG. 6 is convenient for description but may oversimplify the complex inter-relation of elements in the actual circuitry. For example, when a microcomputer is used, the microcomputer may perform portions of functions listed in several of the functional blocks, particularly blocks 303 through 307. There are a number of functionally equivalent methods which may be used to implement a setpoint control in the circuitry. For example, an increase in sensitivity may alternately decrease the ambient light reference, increase the glare causing light signal, or may not directly change either one but alter the comparison and the logic circuit output instead. Computation and logic circuit functions may be distributed through the circuit as they are in the continuously variable reflectance embodiment described hereinafter in detail. There may also be additional signal paths between blocks which are not shown in the simplified block diagrams.

Figure 2:
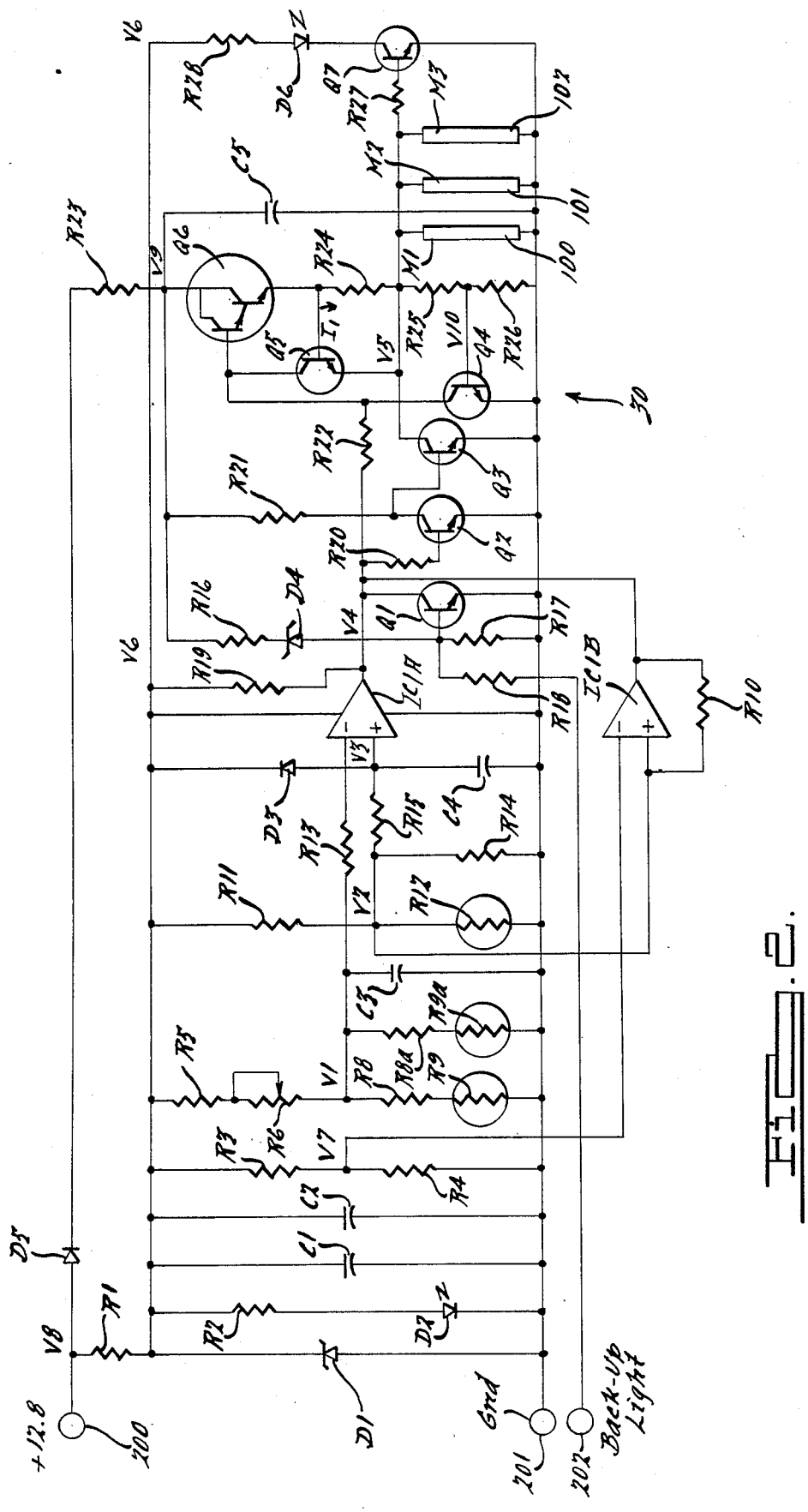
FIG. 2 is a schematic electrical diagram of an automatic rearview mirror system embodying the present invention.
Figure 3:
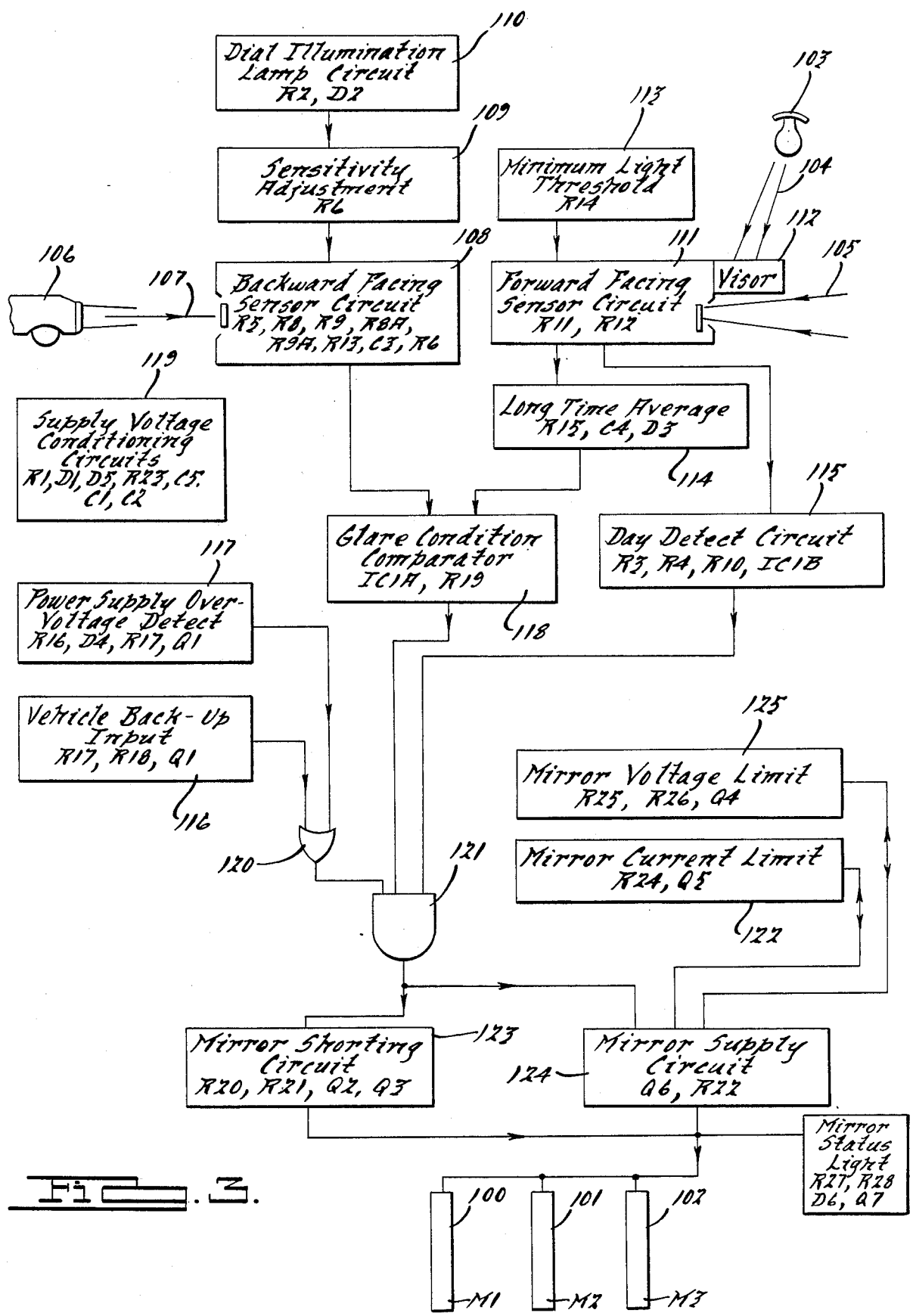
FIG. 3 is a schematic block diagram of the automatic rearview mirror system illustrated in FIG. 2, and showing the components incorporated in various sections of the system.

Referring to FIGS. 2 and 3, a two state automotive glare control system, generally designated 30, is illustrated therein, the system 30 having a stabilizing effect of mirror transition time. Electrochromic mirrors of the type disclosed in said copending application Ser. No. 846,354 are preferably incorporated in an automatic mirror system 30. The time required to change from the low to the high reflectance state in such mirrors is utilized to enhance the overall performance of the automatic mirror system and to simplify the electronic circuitry which is required to control the mirrors. Alternatively, any automatically dimming mirror, which has a relatively slow transition from the low to the high reflectance state can be used with the disclosed control system 30. When using other automatically dimming mirrors, the drive signal to the mirror may be tailored to the specific mirror which is used.

The electrochromic mirrors 100, 101 and 102 utilized in this embodiment of the invention have been optimized to dim in a relatively short interval while the period for clearing has been allowed to remain at about eight seconds. In this embodiment of the invention, the control circuitry for the electrochromic mirror does not include an electronic delay to hold the mirrors in the nonglare state. Instead the natural delay of the electrochromic mirrors prevents an undesirably rapid cycling of the mirrors even though the electrical drive signal to the electrochromic mirrors often switches between the dim and the bright mirror drive states. Because of its relatively fast darkening speed, an electrochromic mirror responds quickly enough to the bright command and thus to bright lights to eliminate annoying glare in nearly all driving situations. In use, the performance of an automatic electrochromic mirror with regard to the frequency and rate of change of the reflective element is more pleasing than the performance of an automatic two position prism mirror. The more desirable performance of the automatic electrochromic mirror is attained by utilizing the natural transition time of the electrochromic mirror to stabilize mirror performance. The delay timing circuit and the additional stabilizing circuit were both used in an automatic two position prism mirror to which the electrochromic mirror was compared. Both of these circuits were eliminated from the circuit of the electrochromic mirror which was used in the comparison.

In addition to the desirable overall timing of the transitions of the electrochromic mirror, the gradual transitions of the reflectance are much more desirable than the abrupt transitions of the mechanically driven two position prism mirror and the almost instantaneous transitions of most liquid crystal display mirrors. The clarity of the reflected image of the electrochromic mirror remains good when the electrochromic layer is partially colored so that the reflectance of the mirror varies continuously between its limiting bright and dim states. The electrochromic mirror of this embodiment of the invention performs better in a variable reflectance mode than any competing device which is known to the inventors. The relatively slow response of the electrochromic mirror has an averaging effect on the frequently switched electrical input yielding a desirable continuous variation in the reflectivity of the mirror. With commonly encountered, rapidly fluctuating glare conditions, attenuation of the reflected light is roughly proportional to the percentage of time that the control circuitry calls for the minor to be in the nonglare condition.

Summarizing the above, the rapid fluctuation of the light levels often encountered while driving causes the automatic mirror control circuitry to frequently switch between commands for the normal and for the nonglare states. The resulting action of a rapidly responding mirror is highly objectionable and additional timing and stabilizing circuits are required to yield acceptable performance. The averaging effect of the slower continuous response in the reflectivity of the electrochromic mirror eliminates the requirement for a delay circuit and further causes the mirror to operate in a generally desirable variable reflectance mode without the need for special control circuits to achieve the variable reflectance operation.

The present invention also solves the need for a variable reflectance mirror which will function as an outside rearview mirror, especially on the driver's side of an automotive vehicle. The need for such a mirror is widely acknowledged but no mirrors suitable for commercial application have been available heretofore. The system 30 embodying an electrochromic mirror operates satisfactorily in this application, the control of the outside mirror(s) being accomplished by paralleling the drive of several mirrors from a common control circuit. It will be understood that the drive may be accomplished by completely independent control circuits, or by partially combined control circuits.

It should be understood that the rear sensor must be fairly directional to avoid nuisance actuation of the mirrors. Yet, the headlamps of an automobile which is slightly back of and to the driver's side of the automobile with the automatic mirror can cast strong glare on the left outside mirror while the inside mirror is almost totally shielded from this light. In the system 30, the signal from a rear facing sensor which is positioned to detect glare on the outside mirror is combined with the signal from the inside mirror to cause both mirrors to dim when strong glare is present on either one. Another desirable option is to use the time average of the forward light level (ambient reference) from one of the mirrors as the input to otherwise independent control circuits for the other mirrors.

Referring to the circuit block diagram of FIG. 3, one or more electrochromic mirrors 100, 101 and 102 are used as the inside rearview mirror and the left outside and the right outside mirrors, respectively, of a vehicle. These mirrors are supplied with approximately 1.2 volts to darken them and are short circuited to clear them rapidly. It has been found that the mirrors 100, 101 and 102 clear within about 20 seconds when open circuited. The electrical supply 119 for the mirrors 100, 101 and 102 is connected to the conventional 12.8 volt automotive supply which is turned on by the vehicle ignition switch. The supply circuit 119 limits supply voltage transients and regulates the supply voltage to a portion of the system.

The backward facing sensor circuit 108 senses light rays 107 from the headlamps of the vehicle 106 generating an electrical signal indicative of the glare producing light from the rear. A sensitivity adjustment 109 is available to the driver and is illuminated by a dial illumination lamp circuit 110.

The forward facing sensor circuit 111 senses the ambient light rays 105 to the front of the vehicle, while the visor 112 shields the sensor from the rays 104 of streetlamp 103 which is nearly overhead. The purpose of the forward sensing circuit 111 is to respond to ambient light in much the same way as the driver's eyes respond and to establish the operating threshold of the mirror accordingly.

For ambient light level less than 0.02 footcandles, the actual ambient light level has very little effect on the driver's perception of glare. The minimum light threshold circuit 113 causes the output of the forward facing circuit 111 to approach a constant value for light levels which are less than 0.02 footcandles. A time average of about 25 seconds is applied to the forward light signal by a long time average circuit 114 to produce a time averaged ambient light reference signal against which the signal from the backward facing sensor circuit 108 is compared. This time average stabilizes the reference signal and causes it to track the slow response of the human eye to changing light levels. A comparator circuit 118 is provided which signals a glare condition when the signal from the backward facing sensor circuit 108 indicates a glare light level which exceeds the reference level established by the time averaged forward signal.

Several other signals combine to override the glare determination and to hold the mirrors 100, 101 and 102 in the bright condition. First, a day detector circuit 115 compares the forward signal against a fixed threshold equivalent to approximately two footcandles and holds the mirrors in the bright condition when the forward light level exceeds this threshold. Second, a vehicle backup detect circuit 116 monitors the backup light signal, which indicates that the vehicle is in reverse gear, and holds the mirrors in the bright condition to improve visibility when the vehicle is in reverse gear. Third, a power supply overvoltage detection circuit 117 is provided which holds the mirrors in the bright condition when the automotive supply voltage exceeds a safe operating range for circuit components. The specific objective is to limit the power dissipation of the transistor Q6 to a range in which failure due to secondary breakdown or to simple overheating will not occur. The circuits 116 and 117 share several circuit components such as the resistor R17 and the transistor Q1.

Signals are added together at 121 to command the dim state whenever the glare condition is detected and none of the three inhibiting conditions is present. The mirror supply circuit 124 operates in conjunction with the current limit circuit 122 and voltage limit circuit 125 to supply approximately 1.2 volts to the mirrors 100, 101 and 102 to cause them to assume the dim state. The mirrors return spontaneously to their bright states within approximately 20 seconds of the time that the 1.2 volt supply is removed. The mirror shorting circuit 123 short circuits the inputs to the mirrors to speed their return to the bright state.

In operation, it is normal for the command signal from 121 to change frequently between commanding the bright and the dim mirror states. The mirrors respond rapidly enough to the dim command that the driver is normally not bothered by excessive glare. The natural delay of the mirrors in returning to their bright states prevents the annoying and disorienting changes in mirror brightness which is associated with other fast responding mirrors when driven by the simplified control circuit. Furthermore, most other mirrors have short periods of unusability or of high distortion during their transition. For example, most liquid crystal display mirrors scatter light for about one half second following a transition, while a two position prism mirror is misaimed while traveling from one position to another. In contrast, the electrochromic mirror assumes intermediate reflectance and remains usable during all stages of the transition.

Optionally, as will be described hereinafter in greater detail, glare may be sensed through an attenuating layer of the mirror as indicated in FIG. 8. As the glare causing light level increases above the glare threshold level, the control circuitry switches to the low reflectance drive state until the attenuating layer darkens enough to reduce the measured glare causing light to a level which is below the glare threshold. The circuitry then switches to the high reflectance drive state until the attenuating layer clears enough to increase the measured glare causing light to a level which is again above the glare threshold. The circuitry then switches to the low reflectance drive state and continues to cycle in this manner maintaining the reflectance of the mirror at an intermediate level.

Referring to the schematic electrical diagram in FIG. 2, the system 30 is connected to ground at terminal 201, to the backup light circuit at terminal 202, and to the 12.8 volt supply which is turned on by the ignition switch at terminal 200. Power is supplied to the measuring and logic portions of the system through the current limiting resistor R1 and V6 is clamped to 9.1 volts by the zener diode D1. The current through the current limiting resistor R2 lights the light emitting diode D2. The capacitors C1 and C2 filter the circuit supply voltage V6, while the resistors R3 and R4 establish a reference voltage of about 0.3 volts which is used as the day detect threshold.

The series resistors R5 and R6 form a half bridge with the light sensing resistors R9 and R9A and the series resistors R8 and R8A. The rheostat R6 is adjustable by the driver of the vehicle with higher resistance settings causing increased sensitivity of the system. The conduction of the light sensing resistors R9 and R9A increases with increasing light level decreasing voltage V1. The resistor R9 is positioned to detect light which causes glare from the inside rearview mirror 100 and the optional light sensor R9A is positioned to detect light which causes glare from the outside mirror 101 on the driver's side. The sensor R9A is preferably selected to be less sensitive than the sensor R9. This eliminates many nuisance responses of the mirror due to stray lights detected by the outside sensor R9A. It will be understood that the car roof and body restrict the light which reaches the inside sensor R9. The inside sensor is, thus, shielded from the light of many of the lighted roadside signs and from other sources of light which do not normally cause glare for the driver. The outside sensor preferably has a viewing angle that is restricted as much as possible. Its viewing angle must still be relatively wide to pick up very bright lights from vehicles to the side. Such lights often do cause glare for the driver and, because the vehicle is close, they are usually very bright. The less sensitive outside sensor picks up these bright lights which are often obstructed from striking the inside sensor, and the reduced sensitivity of the outside sensor prevents many of the nuisance responses which would otherwise be caused by lights from other sources. A third light sensor (not shown) many optionally be used to detect light which causes glare from the right or passenger side outside mirror 102. The second outside sensor when used is also preferably of a reduced sensitivity. The resistors R8 and R8A limit the minimum value of V1 so that the sensitivity of the mirror is reduced at very high ambient light levels. The resistor R5 limits the minimum value of the series combination of the resistors R5 and R6 thus establishing the minimum sensitivity to which the mirror may be set. Capacitor C3 prevents very rapid fluctuation of V1.

The resistor R11 forms a half bridge with the forward light sensing resistor R12. The conduction of the resistor R12 increases with increasing forward light level decreasing voltage V2. The resistor R14 is in parallel with the resistor R12 and establishes the maximum vale of V2 when the light level sensed by the resistor R12 is very low and the resulting resistance of the resistor R12 is very high. The effect is to limit the maximum sensitivity of the circuit for low forward light levels. This maximum sensitivity is still controlled by the rheostat R6. The resistor R15 and the capacitor C4 average the voltage V2 to form a reference voltage V3. The comparator IC1A turns on pulling output V4 to ground when the voltage V1 exceeds the voltage V3 indicating a condition of low glare.

When a high ambient light level causes voltage V2 to fall below the voltage V7, the comparator IC1B turns on holding V4 at ground. A high supply voltage V8 causes current to flow to the base of the transistor Q1 from series components diode D5, current limiting resistors R16 and R23 and zener diode D4. This holds V4 at ground. Likewise, voltage from the lighted backup lights at the input 202 causes current to flow through the resistor R18 turning on the transistor Q1. The resistor R17 prevents small leakage currents from turning on the transistor Q1.

When V4 is at ground, the transistor Q2 is turning off as is the transistor Q6 and current through the current limiting resistor R21 turns on the transistor Q3 which effectively short circuits the mirrors 100, 101 and 102 causing V5 to fall to nearly zero volts. This speeds clearing of the mirrors.

When V1 is lower than V3 indicating a glare condition, the output of the comparator IC1A is turned off. When conditions are such that the comparator IC1B and the transistor Q1 are also turned off, V4 is pulled high through the current limiting resistor R19. The transistor Q2 is turned on by current through the resistor R20 and the transistor Q3 is turned off preventing its shorting action on the mirrors. The transistor Q6 is turned on by current through the resistor R22 supplying current I1 to the mirrors. If I1 exceeds a safe value, the voltage across the current sensing resistor R24 turns on the transistor Q5 diverting current from the base of the transistor Q6 thereby regulating the maximum value of I1. When V5 reaches approximately 1.2 volts, the voltage V10 from the divider formed by the resistors R25 and R26 turns on the transistor Q4 diverting current from the base of the transistor Q6 and thereby regulating the maximum value of V5.

The resistor R13 approximately balances the impedance at the two inputs of the comparator IC1A. The diode D5 prevents damage due to negative supply voltages at V8. The time constant formed by the resistor R23 and capacitor C5 limit the voltage V9 at the collector of the transistor Q6 produced by short transients of supply voltage V8. The diode D3 discharges the capacitor C4 when the circuit is de-energized so that the mirrors tend to stay in the bright condition after a momentary supply voltage interruption. When V5 is high causing the mirror to dim, current through R27 turns on Q7 lighting status LED D6. R28 limits the current to D6.

An identification of an/or typical values for the components of the system illustrated in FIG. 2, which are described hereinabove, are as follows:

| | | |
|---|---|---|
| R1 | Resistor | 270 ohm, 1 W |
| R2 | Resistor | 820 ohm |
| R3 | Resistor | 2.7 megohm |
| R4 | Resistor | 100K ohm |
| R5 | Resistor | 39K ohm |
| R6 | Resistor | 1.8 megohm |
| R8 | Resistor | 15K ohm |
| R8A | Resistor | 15K ohm |
| R9 | Resistor | Photo Resistor |
| R9A | Resistor | Photo Resistor |
| R10 | Resistor | 6.8 megohm |
| R11 | Resistor | 270K ohm |
| R12 | Resistor | Photo Resistor |
| R13 | Resistor | 390K ohm |
| R14 | Resistor | 560K ohm |
| R15 | Resistor | 470K ohm |
| R16 | Resistor | 2.2K ohm |
| R17 | Resistor | 4.7K ohm |
| R18 | Resistor | 27K ohm |
| R19 | Resistor | 3.3K ohm |
| R20 | Resistor | 22K ohm |
| R21 | Resistor | 1.5K ohm, ½ W |
| R22 | Resistor | 3.3K ohm |
| R23 | Resistor | 10 ohm, 10 W |
| R24 | Resistor | 1 ohm, 1 W |
| R25 | Resistor | 2.7K ohm |
| R26 | Resistor | 2.2K ohm |
| R27 | Resistor | 1K ohm |
| R28 | Resistor | 1K ohm |
| C1 | Capacitor | 47 mfd. 10 V |
| C2 | Capacitor | .022 mfd. |
| C3 | Capacitor | .022 mfd. |
| C4 | Capacitor | 47 mfd. 10 V |
| C5 | Capacitor | 100 mfd. 60 V |
| D1 | Diode | IN4739A |
| D2 | Diode | LED -- ROHM SLH-56 MT3 |
| D3 | Diode | IN4148 |
| D4 | Diode | IN4747, 20 V, 1 W |
| D5 | Diode | IN4004 |
| D6 | Diode | LED -- ROHM SLH-56 MT3 |
| Q1 | Transistor | 2N3904 |
| Q2 | Transistor | 2N3904 |
| Q3 | Transistor | 2N3904 |
| Q4 | Transistor | 2N3904 |
| Q5 | Transistor | 2N3904 |
| Q6 | Transistor | TIP101 |
| Q7 | Transistor | 2N3904 |
| IC1A | Comparator | LM2903 or LM339 (Motorola) |
| IC1B | Comparator | LM2903 or LM339 (Motorola) |

It will be understood that these values and/or descriptions may be varied depending upon the particular application of the principles of the present invention.

Automotive Application of Mirror Control Circuit

Figure 4:
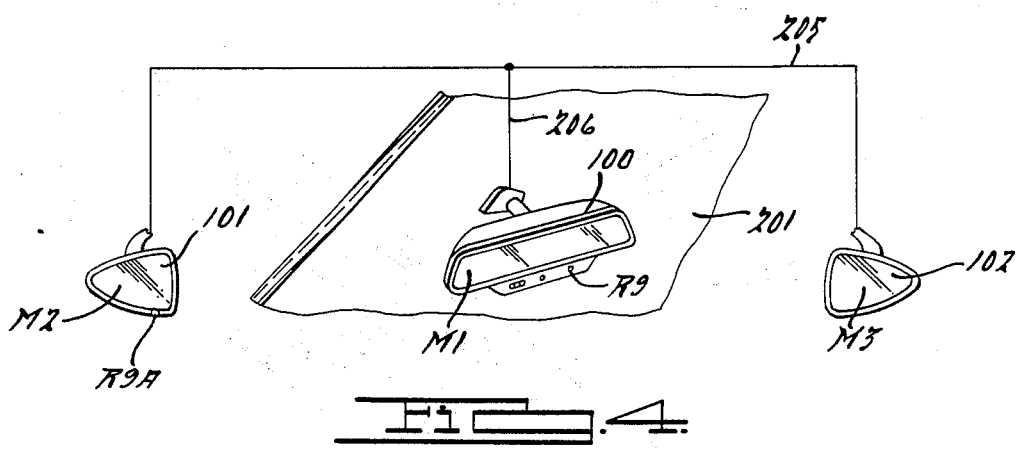
FIG. 4 is a perspective view of an automatic rearview mirror system embodying the present invention, and showing an inside mirror installed on the windshield of a vehicle and two outside rearview mirrors installed on the outside of the vehicle in a conventional manner whereby each of the mirrors faces rearwardly of the vehicle in a conventional manner.

FIG. 4 is a diagram which depicts the automobile application of the disclosed system. The inside rearview mirror 100 is shown mounted to the windshield 201 which is shown in partial view. The left side mirror 101 and the right side mirror 102 are connected to the mirror 100 by a conventional wiring harness 205. The 12.8 volt ignition switched power from the automotive supply enters the mirror wiring system at 206. The case of the mirror 100 houses the major portion of the circuit shown in FIG. 2. The elements M1, M2 and M3 are the electrochromic mirror elements which are shown in FIGS. 2 and 3. The resistors R9A and R9 are the backward facing photo-sensors also shown in FIGS. 2 and 3. Excessive light striking either of the transistors R9 and R9A causes the mirror elements M1, M2, and M3 to dim. Optionally, the system can be configured without the sensor R9A.

Mirrors With One or More Intermediate Reflectance States

As noted earlier, the commonly used two position prism mirror element is strictly a dual reflectance device. Liquid crystal mirror elements which have shown some promise in the dimming mirror application and which are known to the inventors are also dual reflectance devices. The electrochromic mirror element embodied in the present invention is the only one known to the inventors that will provide a continuously variable reflectance over a wide (4 percent to 80 percent) range. In the inventors' experience with automatically controlled two position prism mirror elements, the need for a continuously variable reflectance or at least for an intermediate reflectance level remains the greatest technical limitation of the prior manual and automatic prism mirrors.

The prism mirror element which is presently used in the inside rearview mirror of most automobiles has a reflectance of greater than 80 percent in its bright state and less than 5 percent in its dim state. High end reflectance levels of greater than 70 percent are very desirable and high end reflectance levels which exceed 55 percent are required for satisfactory inside mirror performance. On the other hand, low end reflectance levels of approximately 6 percent are needed since at these reflectance levels, bright headlights still cause some discomfort for drivers whose eyes are adjusted to very low ambient light conditions. The ratio between the required high and low end reflectances preferably exceeds nine to one.

In many crowded freeway and suburban night driving situations, neither a reflectance of 6 percent nor a reflectance of 80 percent is satisfactory. In such situations, the ambient light levels are usually moderate and the driver's eyes are somewhat sensitive to glare. Thus, a reflectance of 80 percent is unsatisfactory and a reduced reflectance level is needed. Only headlights are clearly visible in a mirror which has a reflectance of only 6 percent. Depth perception gained from details visible only in a higher reflectance mirror is lost. The driver is justifiably uneasy about making driving decisions such as when to switch lanes based on the limited view from a mirror having a reflectance of 6 percent. A single, a multiple or a continuum of intermediate reflectance levels is clearly needed. For example, a mirror with three reflectances—one of 6 percent, one of 22 percent, and one of 80 percent—is highly desirable. The reflectivity of 22 percent is 3.6 times less than the 80 percent high end reflectivity and 3.7 times greater than the 6 percent low end reflectivity. With these nearly equal ratios in reflectivity between the successive incremental reflectance states, the reflective states appear about equally spaced to the driver. This intermediate reflectance fills the gap between the 6 percent and the 80 percent reflectance levels. However, this choice of intermediate reflectance levels may need to be tempered when dealing with special situations such as very low reflectances where the driver's inability to see detail becomes a complicating factor. If, for example, a reflectivity of 22 percent makes it difficult to see in city driving and a reflectance of 30 percent improves visibility significantly, 30 percent may be chosen for the intermediate level instead of 22 percent.

In the previously described embodiment of the mirror control circuit which utilizes a two state drive circuit for the mirror, intermediate reflectance levels are obtained by utilizing the relatively slow but smooth transitions of the reflectance of the electrochromic element to average a two state command signal and thus achieve a degree of intermediate reflectance control. In the following embodiments to be described, the control circuit automatically selects the reflective state of the mirror based on light levels sensed by the photocells and on the light level histories. In one embodiment, the reflective state is selected from a continuum of reflectances. In an alternate embodiment, the reflectance state is incrementally controlled and is selected from options which include a high reflectance state, a low reflectance state, and one or more intermediate incremental reflectance states. In the various reflective states, the reflectivity of the mirror does not need to be precisely controlled. It is, however, desirable to choose the successive incremental reflective states to that they appear equally spaced to the driver. This is best accomplished by establishing approximately equal reflectance ratios between the successive incremental reflective states.

FIG. 9 depicts a closed loop reflectance control in which the reflectivity of the mirror element is determined by measuring the intensity of light reflected by the variable reflectance mirror from a reference light source to a detector. In FIG. 9, the light source 602 emits light ray 603 which is reflected from a variable reflectance mirror element 601 as an attenuated ray 604 whose intensity is measured by the sensor 605 and its associated circuit. This control, when used, is a part of the mirror reflectance control 307 in the general block diagram of FIG. 6. A number of variants are possible. First, an obvious problem is to accommodate the light source and the sensor on the viewing side of the mirror. The source and the sensor may be miniaturized and included under the bezel of the mirror. Alternatively, a small portion of the reflective surface may be removed from the back of the attenuating layer of the mirror and replaced by a small reflective area on the front of the mirror. This area with the relative surface on the front may be covered by the bezel of the mirror. The light source and sensor are then positioned behind the mirror element. Other alternatives include removal of a small portion of the reflective layer, and placement of the light source and the sensor on opposing sides of the mirror element. In this latter arrangement, the light makes one pass instead of two through the attenuating layer. This must be taken into account in the control circuit.

Measurement of Glare After Attenuation in the Mirror

The measurement of mirror reflectance in the preceding example is relatively straight-forward but very cumbersome and costly. If glare is measured after attenuation in the mirror element, the need to know the actual reflectance of the mirror is reduced if not eliminated. The purpose of the variable reflectance mirror is to control the glare that the driver receives from the mirror. Thus, it is beneficial to measure the glare causing light after it has been attenuated by the mirror. At this point the measurement directly indicates the glare which is actually seen by the driver. The control circuit for this embodiment varies the reflectivity of the mirror to limit the glare seen by the driver to an acceptable level. It is not necessary for the circuit to separately monitor the mirror reflectance and the intensity of the glare source since the light level reflected to the driver's eyes is all that matters.

In FIG. 7, glare is sensed after it is reflected from and attenuated by the mirror so that the glare causing the light level measurement correlates directly to the glare that the driver sees in the mirror. The sensor 404 is positioned at the edge of the variable reflectance mirror element 400 so as to receive light reflected from and therefore attenuated by the mirror element. The glare causing light ray 402 from the automobile 401 is attenuated and reflected as a ray 403 which is detected by the sensor 404. This path and the resulting attenuation is similar to that of the ray 402a from the automobile 401 which is attenuated and reflected as a ray 403a and viewed by the driver 408. The glare causing light level measured by the sensor 400 corresponds directly to the light level which the driver sees in the mirror.

The sensor 404 of FIG. 7 is used as the sensor element of the means to sense glare causing light 302 of FIG. 6. The signal from the sensing means 302 directly indicates the light level which the driver normally sees in the mirror. With the mirror in its normal automatic mode, the logic and computation circuit 306 uses the ambient light reference signal and the input from the sensitivity adjustment means in combination with the signal from the means to sense glare causing light to determine whether the light that the driver sees is above, at, or below the glare threshold. Based on this determination, the circuit 306 signals the mirror reflectance control circuit 307 to, respectively, decrease, maintain, or increase the reflectance of the mirror. Because the reflectance of the mirror is included in the feedback loop of the control circuit, compensation for variations in the reflectivity of the mirror element is made automatically.

Measurement of Glare After Partial Attenuation

FIG. 8 depicts an alternate sensing arrangement in which light makes one pass through the attenuating layer of the mirror before striking the sensor. The light seen by the driver is the sum of what is reflected to the driver from the front surface of the mirror and that which is reflected from the reflecting surface of the mirror. With some available mirror element constructions, the rays reflected from the front and from intermediate surfaces of the mirror are either very weak or are directed away from the driver and may thus be neglected. The device described below utilizes this type of mirror element for which most of the rays seen by the driver make one pass through the attenuating layer on their way to the reflecting surface and, after being reflected, they make a second pass through the attenuating layer and travel finally to the driver's eyes. From the above it is clear that light which reaches the sensor 504 is attenuated but not to the same extent as is the light which reaches the driver. This inequality in the attenuation levels is a disadvantage. The offsetting advantage is that the sensor is positioned in a convenient location behind the attenuating layer of the mirror. This sensor position is preferable to the sensor position in front of the mirror as depicted in FIG. 7. The partial attenuation of the light striking the sensor in FIG. 8 does not permit full closed loop control of the mirror reflectance based on the level of the light reflected from the mirror to the driver's eyes. The partial attenuation does, however, substantially improve control of the mirror since it allows the control circuit to partially compensate for variations in the reflectivity of the mirror. It also provides for control which enhances the response speed of the mirror in attaining intermediate reflectance levels. The result is significant improvement in control of the reflectivity of the mirror over that which is obtained by a similar control circuit having no feedback on the reflectivity of the mirror.

Measurement of Glare After Partial Attenuation—Sensor Configuration

In FIG. 8, the reflective layer of a variable reflectance mirror 500 has been removed from the window area 505. The ray 502 from the automobile 501 passes through the window 505 in the reflective layer of the mirror 500. The attenuating layer of the mirror spans the windowed area just as it does the main reflective layer backed portion of the mirror. The ray 502 is partially attenuated by the single pass through the attenuating layer of the mirror and emerges as partially attenuated ray 503 which is sensed by sensor 504. In comparison, the ray 506 from the automobile 501 is partially attenuated by a first pass through the attenuating layer of the mirror, is reflected by the reflecting layer of the mirror, and is further attenuated by its second, return pass through the attenuating layer. The attenuated ray 507 is viewed by the driver 508. With the structure described, light is attenuated by a ratio r each time that it passes through the attenuating layer of the mirror. Here r is the ratio of the light intensity after making one pass through the attenuating layer when it is clear to the intensity of the same ray making one pass through the attenuating layer having the given attenuation level. The light is attenuated by a ratio r before reaching the sensor 504 and before being reflected back to the driver. On its return path to the driver 508, the light makes another pass through the attenuating layer again being attenuated by a ratio r. Thus, the total attenuation ratio of the light level which the driver sees due to the attenuating layer of the mirror is $r^2$ while the attenuation ratio of the light to the sensor is r. The above relation applies to the prism version of the electrochromic mirror. This relation can be expanded to adequately characterize mirror elements that may have response characteristics which are different from that described. For example, first surface reflections must be taken into account in mirrors with strong first surface reflections that are aligned with the image which the driver views. Since the light that is reflected from the front surface of the mirror does not pass through the attenuating layer, this component of the mirror's reflected light is not affected by changes in the attenuation of the attenuating layer. In practice, little difference is seen between the performance of a parallel plate mirror element and the prism element when using the sensing configuration of FIG. 8.

Applying the block diagram of FIG. 6 to the sensor configuration of FIG. 8, the sensor 504 of FIG. 8 is used as the sensor element of the means to sense the glare causing light 302 of FIG. 6. The signal from the sensing means 302 is not attenuated to the same extent as the light level which the driver normally sees in the mirror. In the normal automatic mode of the mirror, the logic and computation circuit 306 uses the ambient light reference level in combination with the signal from the means to sense glare causing light and the input from the sensitivity adjustment means to determine the level of glare to which the driver is subjected. The circuit 306 then outputs a signal to the mirror reflectance control 307 to establish the proper reflectivity for the mirror. As will be explained below, the signal from the means to sense glare causing light 302 is interpreted in a way which accounts for the attenuation of the pass through the mirror. Since the attenuation of the attenuating layer in the mirror is not measured in this embodiment, the control circuit 306 must estimate this attenuation to properly interpret the signal from the means to sense glare causing light 302. In this embodiment of the invention, the control circuit 306 assumes that the attenuation of the attenuating layer in the mirror 308 does achieve the attenuation level which is commands the mirror reflectance control 307 to establish. Furthermore, the control circuit 306 commands a mirror reflectance which will, as nearly as possible, attenuate glare just to the point that the light intensity which the driver sees is maintained at the glare threshold. These conditions are met in the following way for the mirror described above. When the light sensed by the sensing means 302 exceeds the glare threshold by a ratio g, then the circuit commands an attenuation ratio of g for one pass through the attenuating layer of the mirror. This results in an attenuation ratio of $g^2$ in the light that the driver sees.

Operation is illustrated by the following example: Assume the light level received by the sensor 504 has been low for a long time and suddenly increases to 4 times the glare threshold and remains at this level. The sensor element of the means to sense glare causing light 302 initially views the light through a clear mirror element so that the means to sense glare causing light initially sees a light level which is 4 times the threshold level (g=4). The glare appears to the logic circuit to be $g^2=4^2$ or 16 times its threshold value. Thus, the logic circuit 306 signals the mirror reflectance control 307 to attenuate the reflectivity of the mirror by a ratio of 16 to 1. As explained above, when the reflectivity of the mirror element falls by a ratio of 4 to 1 from its bright level, the attenuation ratio of the attenuating layer of the mirror is approximately 4 to 1 for two passes and 2 to 1 for one pass. The sensor, thus, sees the light level through a 2 to 1 attenuation. The light level viewed by the sensor is now 2 times the glare threshold and the logic circuit commands a mirror attenuation ratio of $g^2=2^2$ or 4 to 1. Since this is the present attenuation of the mirror, the reflectance of the mirror remains at approximately one fourth of its bright reflectance as desired until the lighting conditions change. This reduces the light which the driver sees to the glare threshold level. Note that the initial response of the control circuit was to drive the mirror to a much lower reflectance. This "over response" of the control circuit to changing glare conditions can significantly speed the response of the mirror element. A second advantage is that the sensing arrangement improves the accuracy with which the reflectance may be established over that obtained with a totally open loop sensor configuration.

Measurement of Glare After Partial Attenuation—Mathematical Description

In FIG. 8, the mirror 500 has a given reflectivity. I506 and I502 are the intensities of the respective rays 506 and 502 coming from the automobile 501. Because they come from the common source, I506 is substantially equal to I502. I507 is the intensity of the ray 507 which is reflected from the mirror 500 when it has the given reflectivity. I507CL is the corresponding intensity when the mirror 500 has its maximum reflectivity. The ray 503 is the continuation of the ray 502 after it has passed through the attenuating layer of the mirror. I503 is the intensity of the ray 503 after transmission through the mirror 500 when it has the given reflectivity. I503CL is the corresponding intensity when the mirror 500 is clear. For the derivation below, a full reflectance threshold light condition is needed. The intensities at this full reflectance threshold condition are labeled I506GT, I507GT, I502GT, and I503GT. In the full reflectance threshold condition, the mirror 500 is clear and the intensities I506GT and I502GT of the rays 506 and 502 from the automobile 501 are exactly at the level which the mirror control circuit detects as the glare threshold. Several definitions follow:

G=I506/I506GT=I502/I502GT=I503CL/I503GT (Ratio by which glare causing light exceeds the glare causing threshold level).

D=I507/I507GT (Ratio by which the light the driver sees exceeds the glare threshold level).

S=I503/I503GT (Ratio by which the sensed glare causing light exceeds the glare causing threshold level).

r=I503CL/I503 (Ratio by which mirror attenuates the light to sensor 504—relative to clear state).

R=I507CL/I507 (Ratio by which mirror attenuates the light reflected to the driver—relative to clear state).

A derivation of the glare level which driver 508 sees follows:

$R=r^2$ (Given property of mirror element)

r=S (Given control circuit function required to yield desired glare reduction. This is realized after a settling time).

I503=I503CL/r (Rearrange r=I503CL/I503).

S=(I503CL/I503GT)/r (Substitute I503=I503CL/r in S=I503/I503GT).

S=G/r (Substitute G=I503CL/I503GT in S=(I503CL/I503GT)/r.

D=G/R (Linear property of mirror attenuation).

r=G/r (Substitute r=S in S=G/r. This is realized after a settling time).

$r^2=G$ (Rearrange equation above. This is realized after a setting time).

R=G (Substitute $R=r^2$. This is realized after a setting time).

D=R/R=1 (Substitute R=G in D=G/R. This is realized after a settling time.

This is the desired result which indicates that the light which the driver sees is maintained at the level he or she has selected as the threshold to glare. This selection is made by adjusting the sensitivity of the mirror control circuit.

The control circuit of this embodiment of the invention adjusts the voltage to the mirror to control its reflectance. There is no direct feedback to verify the actual reflectance which the mirror element has assumed. As a result variations in voltages, variations in temperature, variations in the mirror elements, and imperfections in the algorithm by which the control circuit relates the mirror control voltage to the desired mirror reflectance all contribute to deviation in mirror reflectance from the desired value. As stated earlier, sensing the glare causing light after it has passed through the attenuating layer of the mirror reduces the effect of these errors. In the derivation above, the circuit controlled the attenuation ratio for one pass through the mirror according to the equation, r=S.

Now suppose that the control circuit is in error by a ration E so that instead of r=S, the circuit establishes the attenuation by the formula, r=ES.

S=r/E (Rearrange equation above).

$R=r^2$ (Given property of mirror element).

S=G/r (Linear property of attenuating layer and sensor).

D=G/R (Linear property of mirror attenuation).

r/E=G/r (Substitutes S=r/E in S=G/r).

$r^2=EG$ (Rearrange equation above).

R=EG (Substitute $R=r^2$ in $r^2=EG$).

G=R/E (Rearrange equation above).

D=R/RE=1/E (Substitute G=R/E in D=G/R).

Thus, the light which the driver sees is reduced by the ratio E from the desired level.

Now consider a similar mirror where the glare causing light is not sensed after a pass through the attenuating element of the mirror. Errors similar to those above would result in an error ration E for each pass through the attenuating layer of the mirror. Since the reflected light makes two passes through the mirror, its intensity is reduced by a ratio $E^2$ from the desired level. The factor $E^2$ is substantially greater than the factor E above.

Mirror Control With Three State Reflectance Drive

Figure 5:
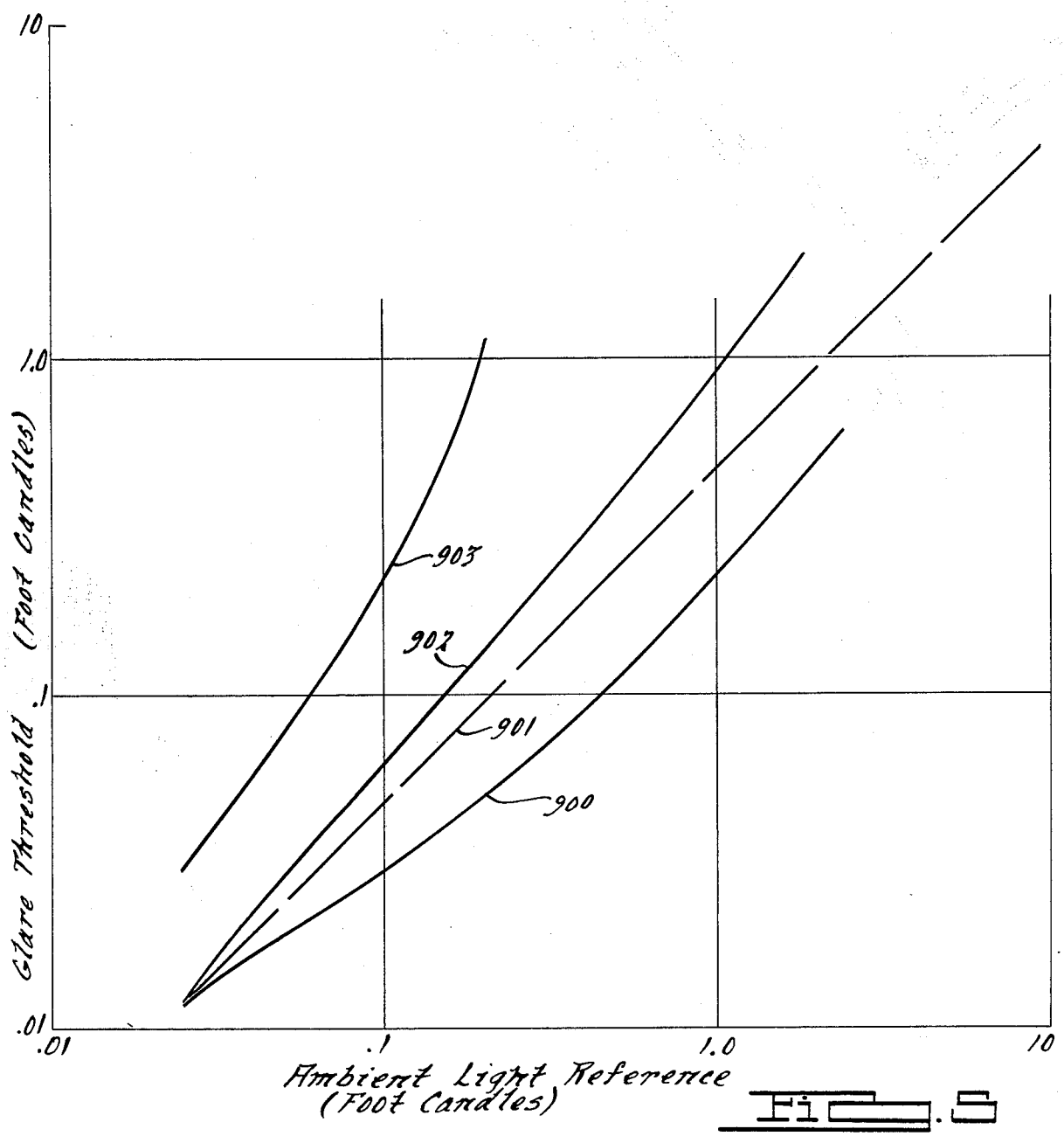
FIG. 5 is a chart showing the relationship of the glare threshold in footcandles with respect to the ambient light reference in footcandles.

FIG. 10 is the circuit diagram of a mirror control which drives the electrochromic mirror(s) with one of three output levels. These three output levels drive the mirror(s) to a high reflectivity when glare is low to an intermediate reflectivity when the glare exceeds an intermediate threshold, and to a low reflectance state when the glare exceeds a high threshold. Reflectances in the three states are nominally 7 percent, 23 percent, and 80 percent. The circuit is configured so that for ambient reference levels which are indicative of low to moderate ambient light levels, the ratio of the glare causing light levels at the high threshold to that at the low threshold is approximately equal to the ratio of intermediate reflectivity of the mirror to the low reflectivity of the mirror. In brightly lighted areas where the ambient reference level is indicative of high ambient light, the circuit requires increasingly high glare causing light levels to cause it to go into the low reference state. Referring to FIG. 5, the plots shown are of circuit threshold levels versus ambient light reference. Note that in FIG. 5 and in the discussion which follows, the ambient light reference is assumed to be the steadily applied ambient light level in footcandles which yields the corresponding ambient light reference level. The curves 902 and 903 are measurements taken on the circuit disclosed herein. For each measurement taken, the ambient light level was held constant for several minutes to allow the time averaging circuit to stabilize and to yield the corresponding ambient reference level. The curve 902 is the threshold for the intermediate reflectance level and the curve 903 is the threshold for the low reflectance level. The vertical distance between the curves 902 and 903 on the log-log plot is a measure of the logarithm of the ratio of the two threshold levels. Note that the curves 902 and 903 are nearly parallel for forward light levels ranging from 0.025 to 0.05 footcandles. The curves then diverge significantly indicating the increased ratio between the threshold values as stated above. The circuit is so tailored because glare is less annoying and visibility is more important in brightly lighted areas. More complicated driving situations which require correspondingly better rearview vision are often encountered in these brightly lighted areas.

The system of FIG. 10 is also configured so that visibility is not reduced by going to the maximum reflectance when the ambient light reference level is high. This is shown by the curve 903 which ends at an ambient light reference level that is just above 0.2 footcandles.

Referring again to FIG. 5, the curve 900 is a plot of the glare or actuation threshold for the production version of the automatic two position prism mirror described in Pat. No. 4,443,057. The line 901 is for reference and represents a mirror control circuit for which the threshold varies in direct proportion to the ambient light reference level. The curve 902 is the threshold for the intermediate reflectance state of the three state circuit and the curve 903 is the threshold for the low reflectance threshold of the three state circuit. On the log-log plot, the relative slopes of the curves 900 through 903 indicates the relative rate of increase in operating threshold versus the ambient light reference light level. Ambient light reference levels between 0.025 footcandles and 0.5 footcandles are often encountered in suburban and in city driving. Note that for this range and for the mirror circuit of Pat. No. 4,443,057, the increase in threshold with increasing ambient light reference levels is generally lower than that for the direct proportional relationship. For the three state mirror the increase in threshold with increasing ambient light reference level levels is generally greater than that for a direct proportional relationship. This is an advantage over the mirrors using the circuit of Pat. No. 4,443,057 in that they are very sensitive in the city. A current source is used to supply the front sensor in the three state circuit. This causes the variation in ambient light sensor signal level versus the ambient light level to exceed the corresponding variation in the glare causing light sensor signal level versus the glare causing light level. The result is an increase in the slope of the glare threshold as a function of the ambient light reference level as shown in FIG. 5. If desired, the slope of the curves 902 and 903 may be lessened to a controlled degree by shunting the ambient light sensor with a resistor. A lower resistance lowers the slopes of the curves. In this way, the relationship between the average ambient light level and the glare threshold levels may be adjusted to meet varying preferences.

In a microcomputer based implementation, the characterization of the glare threshold versus the ambient light reference level may be accomplished in the microcomputer. For example, a look-up table or equations may be used to characterize the glare threshold versus the ambient light reference level.

Referring again to FIG. 10, a three state reflectance system, generally designated 30B, is illustrated therein. The system 30B is connected to the 12.8 volt automotive supply at terminal T101, to ground at terminal T102, and to the back-up light line at terminal T103. The variable resistor R105 is a sensitivity adjustment which has an adjustment knob that is accessible to the driver. The light emitting diode D108 illuminates the controls of the mirror, while the light emitting diode D106 is lighted to indicate that the circuit has sensed a glare causing light level which is above the glare threshold. The intensity of the light emitting diode D106 is varied to indicate the glare level. The light sensors R107 and R110 are cadmium sulfide photoresistors which have very low conductivities when dark and whose conductivities increase approximately in direct proportion to the light level impinging upon them. Each sensor has a resistance of approximately 10,000 ohms at 2 footcandles. The light sensor R107 is the ambient light sensor and is positioned to view a relative wide angle through the windshield of the automobile, the elevational viewing angle preferably being restricted to about 30 degrees to limit response to the sensor to overhead streetlights. The light sensor R110 is the glare causing light level sensor and is positioned to view light coming through the rear window of the automobile. The viewing angle of the light sensor R110 is more restricted, being adjusted to pick up light from sources which are likely to cause glare in the rearview mirror(s). The mirror M1 and optional additional mirror(s) M2 are the solution phase electrochromic mirrors previously described and go to their maximum reflectivities when shorted or open circuited. They go to their minimum reflectances when supplied with about 1.0 volts and to their intermediate level when supplied by about 0.6 volt at 25C and about 0.55 volts at −20C. The circuit of FIG. 10 uses a transistor to short circuit the mirror(s) to drive them to their clear state. This speeds the clearing of the electrochromic layer and the resulting transition of each mirror to its clear state.

In detail, current from the supply terminal T101 flows through the resistor R101 to maintain circuit supply voltage V102. The zener diode D101 conducts when V102 exceeds 6.8 volts serving to limit and regulate the voltage V102. The capacitors C101 and C102 filter the supply voltage V102. The resistors R102 and R103 form a voltage divider used to establish a reference voltage V103 which is used as the day detect threshold. The series resistors R104 and R105 form a voltage divider with the glare causing light sensor R107 and the series resistor R106 to establish a glare causing light related voltage V104. As the glare causing light level increases, the resistance of the light sensor R107 decreases thereby decreasing the voltage V104. The resistor R105 is adjustable by the driver and is set to a higher resistance value to increase the sensitivity of the circuit. The resistor R104 establishes the minimum sensitivity of the circuit and the resistor R106 limits the minimum value of V104. During the day, the resistances of the sensors R107 and R110 are very low, and the resistor R106 causes V104 to exceed V106 in this condition to prevent the mirror from going to a reduced reflectance state. The resistor R108 and the capacitor C103 form a short time constant which establishes a relatively short time average V105 of voltage V104. V105 is used by the circuit as the glare causing light signal, V105 decreasing with increasing glare.

The resistors R132 and R133 form a voltage divider to establish a relatively constant voltage V113 at the base of the transistor Q108. V131 is held nearly constant at a voltage which is about 0.6 volts higher than V113. Thus, the voltage (V102−V131) across the resistor R109 is nearly constant and so is the resulting current i2. Because of the high gain of the transistor Q108, i3 is nearly equal to i2 and is also nearly constant when the resistance of the light sensor R110 is low enough to sink the current i3. For very low ambient light levels, the resistance of the light sensor R110 is very high causing the transistor Q108 to saturate. When the transistor Q108 is in saturation, V106 nearly equals V131 and the current (i2−i3) flows to the resistor divider through the base of the transistor Q108. V113 increases only slightly since the resistance of the resistor R132 is considerably less than the resistance of the resistor R109. When the transistor Q108 is saturated, the voltage V106 is still within the common mode range of the operational amplifier AMP101 and, thus, provides a nearly constant threshold against which the glare causing light level is compared. This is the desired action since for very low ambient light levels, the sensitivity of human eyes to glare remains nearly constant. As the ambient light level increases, the resistance of the light sensor R110 decreases increasing i3, bringing the transistor Q08 out of saturation and decreasing V106. The impedance of the current source which supplies the light sensor R110 is much higher relative to the sensor R110 than the impedance (R104+R105+R106) which supplies the sensor R107 relative to the sensor R107. Thus, the circuit is more sensitive to changes in ambient light level which are sensed by the light sensor R110 than it is to changes in the glare causing light level which are sensed by the light sensor R107. The result discussed earlier and shown in FIG. 5 is that the glare causing light threshold increases more rapidly with increasing ambient light reference level than was the case for previous circuits.

The resistor R112 forms a time constant of about 22 seconds with the capacitor C104 yielding a relatively long time average V107 of voltage V106. The operational amplifier AMP101 is configured as a unity gain voltage follower so that V108 is a low impedance voltage which is equal to V107. V108 is the ambient light reference level referred to in the generalized block diagram. V108 decreases with an increasing average ambient light level.

The diode D109, the resistor R113, and the resistor R114 form a voltage divider which establishes a high glare threshold V114. In conditions of low average ambient light, V108 is relatively high and the effect of the voltage drop across the diode D109 on the voltage V114 is relatively small. In high ambient light conditions, most of the voltage drop from V108 occurs across the diode D109 causing V114 to fall to nearly zero thereby preventing the mirror from going into its minimum reflectance state. With increasing average ambient light level, the general effect of the diode D109 is to require increasingly bright glare to cause the mirror(s) to go to their minimum reflectance state. The minimum reflectance state is disabled altogether for very high average ambient light levels. The mirror(s) spend more time in the intermediate reflectance state and less time in the low reflectance state when the ambient light level is high.

As previously noted, V108 is the ambient light reference level and V105 is the signal which is related to the glare causing light level. The operational amplifiers, AMP102, and AMP103, are used as voltage comparators. With no glare, V105 is higher than V108 causing the output voltage V109 of the operational amplifier AMP102 to be high and V105 is also higher than V114 causing the output voltage V110 of the operational amplifier AMP103 to be high. The high voltage level at V109 causes the diode D103 to conduct pulling V116 high, supplying base current to the transistor Q102 through the resistor R120 and to the transistor Q105 through the resistor R125. The base currents turn on the transistors Q102 and Q105. Such transistors are also turned on when V116 is pulled high by a high voltage level from back-up light input T103 which pulls V116 high through the resistor R112 and the diode D105, or when V116 is pulled high by current through the diode D104 from a high output of the operational amplifier AMP104. The operational amplifier AMP104 is used as a comparator to compare the reference voltage V103 established by the divider resistors R102 and R103 against V106. V106 is low in daylight when the ambient light level is high causing the resistance of the ambient light sensor R110 to be low. When V106 is lower than V103 indicating a daylight condition, the output V117 of the operational amplifier AMP104 is high. Summarizing, V116 is high when glare is low or when a daylight condition exists or when the back-up lights are energized indicating that the automobile is in reverse gear. A high voltage level at V116 turn on the transistor Q102 holding the reference input V111 to the mirror supply circuit low turning off the output mirror supply voltage. The high voltage level at V116 also turns on the transistor Q105 shorting the mirror(s), thus speeding the rate at which they go to their respective high reflectance states.

As the glare causing light level increases, V105 decreases. When V105 falls below V108, output V109 of the operational amplifier AMP102 goes low. If V117 is also low indicating the night condition and V115 is also low indicating that the car is not backing up, V116 is low and the transistors Q102 and Q105 are turned off. With the transistor Q105 off, the mirror element voltage V112 is allowed to rise. With the transistor Q102 off, the input reference voltage V111 is allowed to rise.

When the transistor Q102 is off, V111 assumes an intermediate or a high mirror element drive voltage reference level depending on whether the transistor Q101 is turned on or off. When glare is mild, voltage V105 is lower than V108 but higher than V114 causing V110 to be high and V109 to be low indicating the mild glare condition. When V110 is high, current flows through the resistor R115 turning on the transistor Q101 and shunting the diode D102 with the resistor R116 causing V111 to assume its intermediate reference voltage level. As the glare causing light level increases, V105 decreases until V105 falls below V114 causing V110 to go low indicating the high glare condition. The transistor Q101 is turned off removing the shunting effect of the resistor R116. The voltage across the diode D102 increases resulting in an increase in reference voltage V111 to its high reference voltage level. When V111 is at its intermediate or its high level and mirror voltage V112 is low, the transistor Q103 is turned on turning on the transistor Q107 and supplying current to the mirror(s) through the current sensing resistor R129. When V112 rises to the point that the base to emitter junction of the transistor Q103 no longer has sufficient forward bias, the current in the transistor Q103 decreases, decreasing the base drive to the transistor Q107 and limiting the voltage V112. The voltage V112 is thus regulated at a level which is one base to emitter junction drop lower than the reference voltage V111. This base to emitter voltage decreases with increasing temperature causing the difference between V112 and V112 to decrease with increasing temperature. At the intermediate level to V111, the diode D102 is biased nearly out of conduction and V111 is relatively stable with temperature. Thus, the effect of the decrease in the base emitter voltage of the transistor Q103 with increasing temperature is to increase the mirror element voltage V112 with increasing temperature. In the intermediate reflectance state, the reflectivity of the mirror elements M1 and M2 decrease with increasing temperature. Thus, the increase in the voltage V112 with increasing temperature approximately compensates for the temperature dependence of the mirror elements. At the high level of V111, the diode D102 is conducting and the voltage across the diode D102 decreases with increasing temperature causing a corresponding decrease in reference voltage V111 with increasing temperature. This decrease approximately matches the decrease in the base to emitter voltage of the transistor Q103. The result is that the high level drive voltage remains nearly constant with temperature. This is desired, since it is not desirable to overdrive the mirror elements when the ambient temperature is high.

The status light emitting diode D106 is turned off when no glare is present, is turned on at low brightness for moderate glare, and is turned on at a noticeably higher brightness for high glare. The transistor Q104 is used to sink current from the diode D106. For no glare, V111 is low turning off the transistor Q104 and the light emitting diode D106. For moderate glare, V111 is approximately 1.2 volts. The series resistors R123 and R124 conduct turning on the transistor Q104 and drawing current to dimly light the light emitting diode D106. Voltage V119 is not high enough to result is significant conduction of D111. For strong glare, V111 is approximately 1.7 volts. The resistors R123 and R124 conduct as before and the diode D111 is biased into conduction substantially increasing the current through the resistor R123 and brightly lighting D106.

When the total current I1 to the mirror elements increases, the voltage across the resistor R129 increases until the transistor Q106 turns on diverting current from the base of the transistor Q103 which limits the base drive to the transistor Q107 which limits I1. When V132 rises to about 21 volts, current through the resistor R126 and the diode D107 turns on the transistor Q106 turning off the transistors Q103 and Q107, thus reducing I1 to nearly zero. This protects the transistor Q107 from excessive power dissipation and possible secondary breakdown when the automotive supply voltage to the mirror is abnormally high.

The diode D110 protects the mirror from negative supply voltage transients and the resistor R130 and the capacitor C105 limit the effect on V132 of rapidly changing supply voltage transients. The resistor R134 balances the impedances at the two inputs of the operational amplifier AMP101. The optional resistor R135 provides a small amount of positive feedback to prevent very rapid cycling of the mirror drive circuit. The resistor R136 limits base current to the transistor Q107 and the capacitor C106 stabilizes the feedback loop formed by the transistors Q103 and Q107 and the associated circuitry.

The glare causing light sensor R107 may optionally be placed to receive light that has passed through the attenuating layer of the mirror or of a similar element as shown in FIG. 8. The resistor R113 is then decreased to about 8,200 ohms. Operation of the circuit is similar to that described above except that increasing attenuation of the mirror element reduces the glare producing light signal. The result is that the control circuit cycles between states whenever the glare is only slightly above a threshold level. This cycling is averaged by the relatively slow response of the mirror(s). The result is limited proportional control of the reflectance of the mirror(s) over a relatively wide range of reflectiveness. Additional benefits are that the circuit "over reacts" to rapid changes in light level speeding the response of the mirrors. Also, the control circuit responds to changes in reflectivity of the mirror bringing it closer to the desired reflectivity. It will be understood by those skilled in the art that comparator circuits may be added in a straight-forward manner to extend this circuit to four or more drive states.

The marked advantages of an intermediate reflectance state have been discussed hereinabove. A primary advantage of the system of FIG. 10 is that the relationship between the intermediate and the strong glare thresholds is characterized over a wide range of ambient light conditions. With the diode D109 shorted, a nearly constant ratio between the glare causing light threshold level at the intermediate glare condition to the glare causing light threshold level at the strong glare condition is maintained over a wide range of ambient light levels. Furthermore, in such circuit, this ratio may be altered by adjustment of resistance values to alter the ratio between the resistor R114 and the resistors R113+R114. As previously discussed, the ratio is selected so that the glare which the driver sees is limited as nearly as possible to a level that is just below that which will cause discomfort. Also, the discomfort caused by glare must be balanced against the need to see detail. In brightly lighted city driving, it is necessary to see more detail. The diode D109 is included in the circuit in order to temper the ratiometric relation described above so that the ratio between the glare causing light threshold level at the intermediate glare condition to the glare causing light threshold level at the strong glare condition is increased as the ambient light reference level increases. The result is that under brightly lighted city driving conditions, the mirror assumes its minimum reflectance state only when glare is extremely bright. A realistic balance is thus achieved between the driver's comfort and the driver's need to see.

Since light levels encountered by the driver vary by many orders of magnitude, a change in light level of even two to one is only mildly noticed by the driver. Prior commercially acceptable nonglare mirrors have only two reflectance states with the bright state being about twenty times brighter than the dim state. With these mirrors any change in reflectance is by a factor of twenty, which is a very noticeable increment that is often too large, while smaller factors of two or three may not even be noticed by the driver. In connection with a driver's perceptions, a control should be considered generally equivalent if the results are perceived to be the same by the driver. Thus, when terms such as ration, constant, and increasing are used herein, they should be interpreted in a correspondingly general sense. For example, in the foregoing discussion, the important fact is that, when ambient lighting is relatively bright, the mirror assumes very low reflectances only when glare is very strong.

An identification of and/or typical values for the components of the system illustrated in FIG. 10, which are described hereinabove, are as follows:

| | | |
|---|---|---|
| R101 | Resistor | 270 ohm, 1W |
| R102 | Resistor | 680 K ohm |
| R103 | Resistor | 10 K ohm |
| R104 | Resistor | 39 K ohm |
| R105 | Resistor | 2.2 M ohm |
| R106 | Resistor | 15 K ohm |
| R107 | Photocell | |
| R108 | Resistor | 220 K ohm |
| R109 | Resistor | 100 K ohm |
| R110 | Photocell | |
| R112 | Resistor | 390 K ohm |
| R113 | Resistor | 22 K ohm; * 8.2 K ohm |
| R114 | Resistor | 15 K ohm |
| R115 | Resistor | 10 K ohm |
| R116 | Resistor | 22 ohm |
| R117 | Resistor | 1 K ohm |
| R118 | Resistor | 1.8 K ohm |
| R119 | Resistor | 470 ohm |
| R120 | Resistor | 10 K ohm |
| R121 | Resistor | 10 K ohm |
| R122 | Resistor | 1 K ohm |
| R123 | Resistor | 270 ohm |
| R124 | Resistor | 1.2 K ohm |
| R125 | Resistor | 1.5 K ohm |
| R126 | Resistor | 2.2 K ohm |
| R127 | Resistor | 100 ohm |
| R128 | Resistor | 470 ohm |
| R129 | Resistor | 1.8 ohm, ½ W |
| R130 | Resistor | 10 ohm, 5 W |
| R131 | Resistor | 1 K ohm |
| R132 | Resistor | 15 K ohm |
| R133 | Resistor | 15 K ohm |
| R134 | Resistor | 220 K ohm |
| R135 | Resistor | Open |
| R136 | Resistor | 100 ohm |
| C101 | Capacitor | 47 mfd. |
| C102 | Capacitor | .022 mfd. |
| C103 | Capacitor | .022 mfd. |
| C104 | Capacitor | 47 mfd. |
| C105 | Capacitor | 100 mfd. |
| C106 | Capacitor | .001 mfd. |
| D101 | Diode | 1N4148, 9.1V |
| D102 | Diode | 1N4148 |
| D103 | Diode | 1N4148 |
| D104 | Diode | 1N4148 |
| D105 | Diode | 1N4004 |
| D106 | Diode | LED - ROHM SLH 56 MT3 |
| D107 | Diode | 1N4148, 18V |
| D108 | Diode | LED - ROHM SLH 56 MT3 |
| D109 | Diode | 1N4148 |
| D110 | Diode | 1N4004 |
| D111 | Diode | 1N4148 |
| Q101 | Transistor | 2N3904 |
| Q102 | Transistor | 2N3904 |
| Q103 | Transistor | MPSA06 |
| Q104 | Transistor | 2N3904 |
| Q105 | Transistor | 2N2222A |
| Q106 | Transistor | 2N3904 |
| Q107 | Transistor | TIP30B |
| Q108 | Transistor | 2N3906 |
| AMP101 | Operational Amplifier | ¼ LM324N |
| AMP102 | Operational Amplifier | ¼ LM324N |
| AMP103 | Operational Amplifier | ¼ LM324N |
| AMP104 | Operational Amplifier | ¼ LM324N |

It will be understood that these values and/or descriptions may be varies depending upon the particular application of the principles of the present invention.

Figure 13:
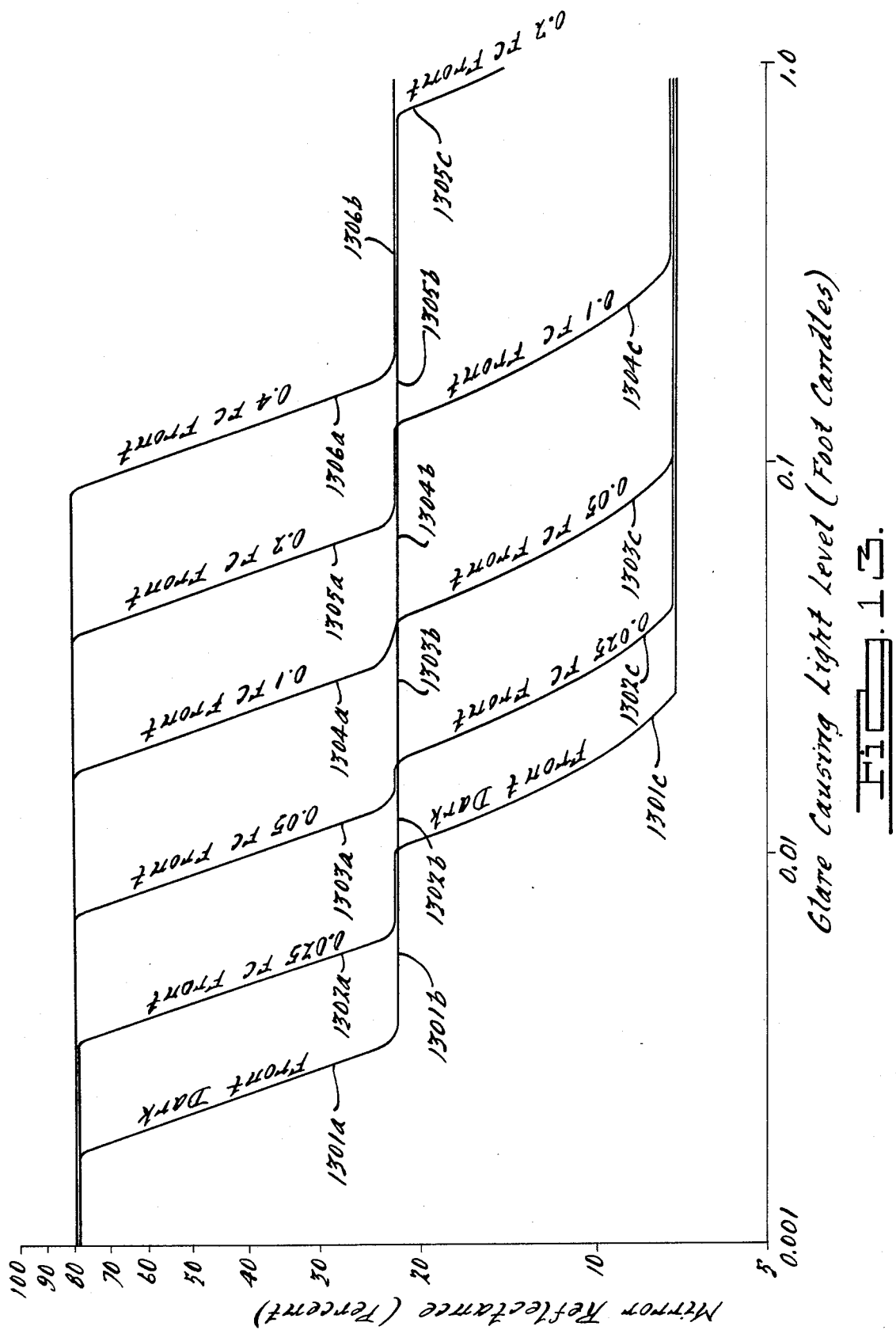
FIG. 13 is a family of curves showing mirror reflectance in percent versus glare-causing light level for six different ambient (front) light levels.

In FIG. 13 a family of curves 1301 through 1306 is depicted showing mirror reflectance in percent versus glare causing light level for six different ambient (front) light levels. The circuit for the mirror is the one shown in FIG. 10. While the mirror is the one illustrated in FIG. 1, the glare causing light being sensed after one pass through the attenuating layer of the mirror as shown in FIG. 8. The mirror goes from a high reflectance of over 80 percent to an intermediate reflectance of about 22 percent to a low reflectance of about 7 percent. Note the sloped portions a and c of the curves. The data depicted in FIG. 13 was taken at a slow rate so that time response of the mirror does not have a significant effect on the shape of the curves. As described earlier, the sloped gradual transitions in the reflectance of the mirror arise from sensing the glare causing light after it has passed through the attenuating layer of the mirror. As shown in FIG. 13, with the front dark, the mirror reflectance 1301a falls below 80 percent at 0.0018 footcandles and below 8 percent at 0.021 footcandles so as the glare causing light level has increased by a factor of just over 10, the reflectance of the mirror has decreased by a factor of 10, maintaining a nearly constant light level at the driver's eyes. With increasing forward light level in progressing from curve 1301 to curve 1306, the trend is to increase the light level range for which the mirror stays in the intermediate state. With 0.4 footcandles on the front, the curve 1306 stays in the intermediate state 1306b and the mirror does not go full dark. Thus in higher ambient light surroundings where traffic is often heavier and rear visibility more important, the mirror allows the glare causing light level which the driver sees to increase before it goes to its minimum reflectance level. In very high ambient light conditions the mirror is completely disabled from going to its full dim state. This is an optional feature which may be optimized by shunting D109 of FIG. 10 with a resistance in the range of 5000 ohms to 100,000 ohms. To minimize or eliminate the feature, D109 can be shorted and R113 increased to about 15,000 ohms. At 0.025 footcandles on the front sensor, the sensitivity is significantly reduced from that of curve 1301 as shown by the curve 1302. With ambient light levels below 0.010 footcandles, the sensitivity remains essentially equal to that shown by the curve 1301 with the front sensor dark (zero ambient light level). As the forward light level increases by a factor of eight from 0.025 footcandles (curve 1302) to 0.2 footcandles (curve 1305), the glare causing light threshold at which the mirror begins to dim increases by a factor of 10.9 from 0.0034 footcandles to 0.037 footcandles. This is in line with the objective to increase the glare causing light threshold at a slightly more rapid rate than that at which the glare causing light level increases for a normal operating range of the mirror.

Figure 11:
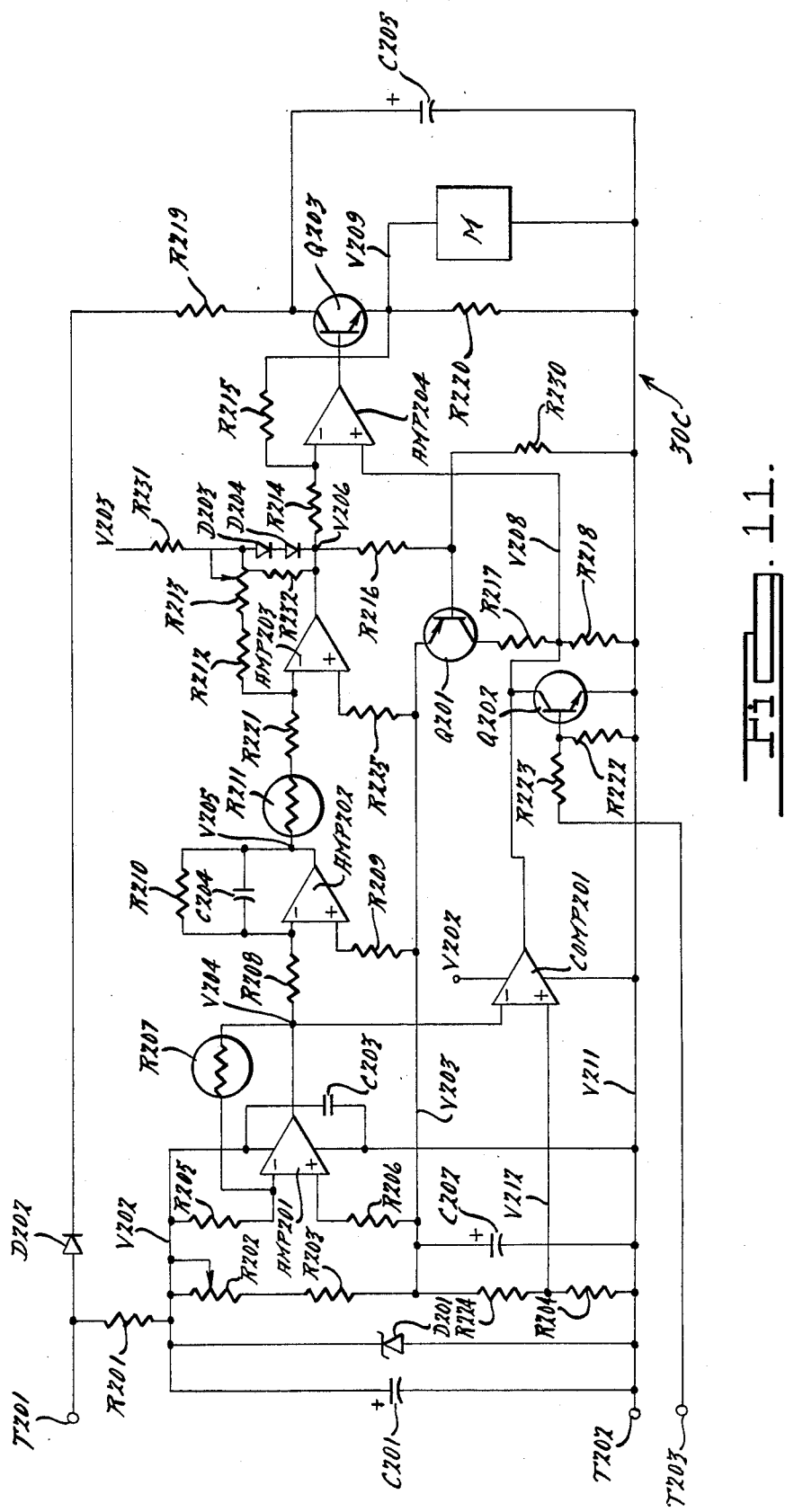
FIG. 11 is a schematic electrical diagram of still another embodiment of the invention.

Another embodiment of the invention is illustrated in FIG. 11, the system 30C of FIG. 11 being configured to measure glare causing light after partial attenuation. The system of FIG. 11 is further configured to control the reflectance of the mirror continuously over its entire reflectance range. In this embodiment of the invention, the ambient light level, the partially attenuated glare causing light level, and the optional sensitivity calibration setting are inputs which are processed by the circuit. The circuit of FIG. 11 establishes and outputs the desired mirror drive signal to control the reflectivity of the mirror. The control algorithm of the circuit very closely approximates the one which was assumed in the sections on "Measurement of Glare After Partial Attenuation".

Figure 12:
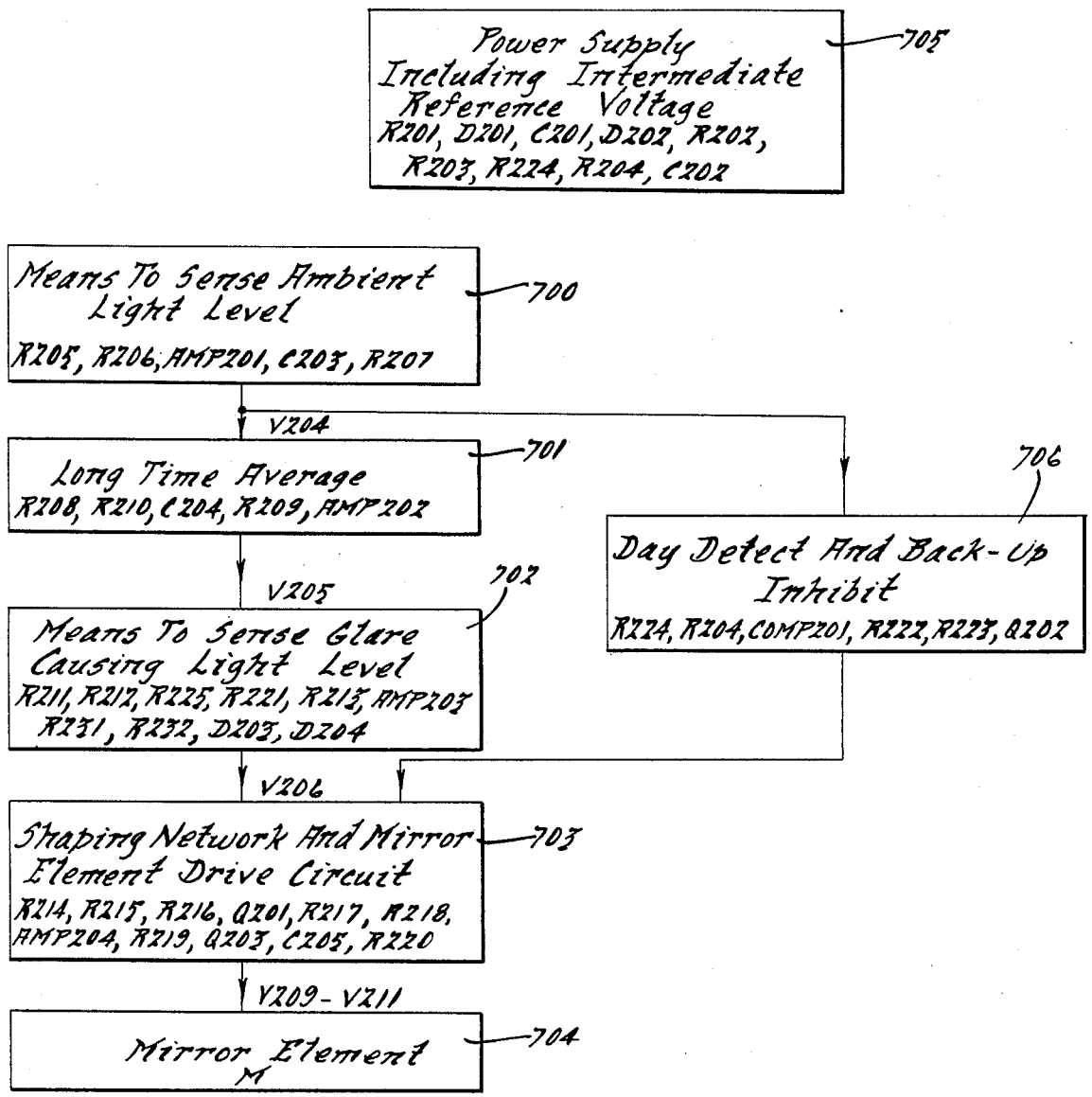
FIG. 12 is a schematic block diagram of the embodiment of the invention illustrated in FIG. 11, and also showing the components incorporated in various sections of this embodiment of the invention.

Referring to the simplified circuit block diagram in FIG. 12, a power supply circuit 705 receives power from the automotive 12.8 volt supply, limits transients from the supply, and provides a regulated positive and an intermediate reference voltage for the operational amplifier circuit. The intermediate reference voltage level is positive relative to the ground of the automotive supply and negative with respect to the regulated positive voltage. In all discussions which follow, it is assumed that the common lead of the voltmeter used to measure circuit voltages is connected to the reference voltage line. Such a connection causes the reference voltage level to be read as zero volts, the positive regulated supply to be read as about +6.3 volts, and the automotive ground or negative supply to be read as about −2.8 volts.

The means 700 to sense ambient light outputs a voltage V204 which varies in approximate inverse proportion to the ambient light level. The long time average 701 averages input signal V204 with a 22 second time constant outputting a time averaged signal V205. V205 is the ambient light reference signal which was described hereinabove. Since V205 is the time average of the reciprocal of the ambient light level, V205 decreases with increasing average ambient light level. The circuit 702 is a variable gain block which senses the glare causing light after it has passed through the attenuating layer of the mirror. The optional sensitivity adjustment rheostate changes the gain constant of the variable gain block, the gain of the block being approximately proportional to the glare causing light level. The ambient reference signal V205 is the input to the gain block 702 and V206 is the output. The magnitude of the output signal V206 increases with an increase in the magnitude of the input signal V205 or with an increase in the gain of the circuit. Thus, the magnitude of V206 decreases with increasing average ambient light level and increases with increasing glare causing light level. The magnitude of V206 indicates the required reduction in the reflectivity of the mirror. When the magnitude of V206 reaches about 0.6 volts, the control circuit begins to reduce the reflectivity of the mirror. As the magnitude of V206 increases above 0.6 volts, the control circuit progressively reduces the reflectance of the mirror until the mirror is driven to its minimum reflectivity when V206 reaches its maximum magnitude of 2.8 volts.

The mirror reflectivity control 703 includes a threshold detector and signal shaping network to establish a mirror drive voltage which yields a desirable functional correspondance between the voltage V206 and the reflectivity of the mirror. The desired functional correspondance is one for which the mirror remains clear until V206 increases to about 0.6 volts. The sensitivity of the circuit is adjusted so that a value of 0.6 volts for the magnitude of V206 corresponds to the light level that the driver perceives as the onset of glare in a clear mirror. For further increases in the magnitude of V206, the reflectivity of the mirror is reduced so that the light level which the driver sees remains approximately constant unless the glare is so strong that the reflectivity of the mirror cannot be further reduced. However, the relationship just stated is not the optimum objective in all cases. Since visibility is normally reduced with decreasing reflectivity of the mirror, it may be desirable to "under compensate" to some degree allowing glare which the driver sees to increase mildly as the reflectivity of the mirror is reduced. A minor modification, such as the one described, in the control algorithm does not invalidate the previous description of the sensing of glare causing light after partial attenuation. Although the equations in the mathematical description do not exactly apply to the modified algorithm, the relationships shown and the reduction in the effects of errors by viewing glare after partial attenuation are still generally correct. The modification is accomplished by tailoring the shaping network so that the reflectivity of the mirror is not decreased quite so much in response to a given incremental increase in the measured glare causing light level. The desired mirror control characteristic is attained by tailoring the shaping circuit 703 to yield the desired correspondance between the magnitude of V206 which is indicative of the glare level and the mirror drive voltage which determines the reflectivity to which the mirror element is driven.

The mirror 704 is an electrochromic mirror of the type described previously. This embodiment of the invention relies on the averaging effect of the relatively slow response of the mirror to prevent annoying erratic changes in the mirror reflectivity. With the mirror of this embodiment of the invention, the rate of decrease in reflectivity due to an incremental increase in the glare level is generally much faster than the rate of increase in reflectivity due to a similar incremental decrease in the glare level. The rates of response vary considerably with conditions so that it is difficult to provide precise numbers. When subjected to strong glare, the mirror in this embodiment colors substantially in less than three seconds. Since the coloring begins almost immediately, this element response speed has been found to be adequate. However, if desired, an increase in the speed of coloring may be provide. The mirror of this embodiment clears substantially in about six seconds. While preferences vary among various drivers, this has been found to be a generally desirable clearing rate. In this embodiment, a resistor in parallel with the mirror provides a discharge path which affects the speed of clearing of the mirror. An increase in the value of the resistor or total elimination of the resistor to give an open circuit shows clearing of the mirror without significantly changing the speed with which the mirror colors. A decrease in the resistance value speeds clearing of the mirror. In summary, the mirror is substantially faster in the rate of coloring than in the rate of clearing and means is provided to adjust the speed of clearing thereby controlling this balance.

When using a fast responding mirror, filtering may be added in the signal path at any point following the block 702 or as a combined portion of block 702. This filtering is preferably biased to allow relatively fast response in making large steps to a lower reflectance. In this way, response of the mirror to strong glare remains rapid but the rate that the reflectivity of the mirror fluctuates in response to fluctuating glare is limited.

The day detect and back-up inhibit circuit 706 inhibits a decrease in the reflectance of the mirror when the automobile is in reverse gear and when light sensed by the ambient light sensor exceeds a threshold above which it is either daylight or dimming of the mirror is largely unnecessary.

Referring again to FIG. 11, the mirror terminal T201 is connected to the 12.8 volt automotive supply which is switched by the vehicle ignition switch. The terminal T202 is connected to ground and the terminal T203 is connected to the back-up light circuit. The potentiometer R213 is a sensitivity adjusting rheostat which is optionally accessible to the driver. The sensors R207 and R211 are cadmium sulfide photoconductive photosensors. The sensor R207 is positioned to sense the ambient light level to which the driver is subjected, while the sensor R211 is positioned as shown in FIG. 8 to sense the glare causing light level. The glare causing light is sensed after being partially attenuated by one pass through the attenuating layer of the mirror.

The supply voltage V202 is maintained by current from the current limiting resistor R201. The zener diode D201 conducts to clamp the voltage V202 at 9.1 volts relative to V211. The capacitor C201 is a filter capacitor for V202. V202 is the positive operational amplifier circuit supply; ground is the negative operational amplifier circuit supply; and V203 is the operational amplifier common or reference voltage. All voltages in the description which follows are referenced to V203. For voltage readings the voltmeter common is on V203. The series resistors R202, R203, R224, and R204 form a voltage divider to establish the operational amplifier reference voltage V203 and day detect reference voltage V212. The resistor R202 is adjusted to set V203 to the desired voltage relative to V202 and V211. The resistor R202 is adjusted so that V211 is −2.8 volts. The diode D202 blocks reverse current; the resistor R219 limits current; and the capacitor C205 limits voltage transients to the transistor Q203. The resistors R206, R209, and R225 supply reference voltage V203 to the noninverting inputs of the operational amplifiers AMP201, AMP202, and AMP203, respectively. The operational amplifier AMP201 supplies a constant current to the sensor R207. The level of the current is established by the resistor R205 which has a voltage V202 across it.

$$V204 = -V202*R207/R205$$

Since for the conductance G207 of R207, $$1/G207 = R207,$$

$$V204 = -V202/(R205*G207).$$

The time constant of the averaging circuit with AMP202 is $$R210*C204 = 22 \text{ seconds}.$$

$$V205 = -(22 \text{ second time average of } V204).$$

Since V204 is proportional to 1/G207 and G207 is approximately proportional to the ambient light level, V202 is approximately proportional to the reciprocal of the ambient light level. Thus, V205 is approximately proportional to the time average of the reciprocal of the ambient light level.

The resistor R221 limits the gain of the circuit of the operational amplifier AMP203 when the illumination of the sensor R211 is high making the resistance of the sensor R211 low. This prevents the mirror from coloring during normal daylight conditions and does slightly decrease the sensitivity of the mirror in high ambient light situations. During normal night driving, the resistance of the sensor R211 is so high that the resistor R221 can be neglected. The resistor R221 is neglected and the optional shaping network R231, R232, D203 and D204 are omitted for the equations which follow. Let $$RF = R212 + R213.$$

Then,
$$V206 = -V205*RF/R211.$$ Since for the conductance G211 of G211, $$G211 = 1/R211,$$

$$V206 = -V205*RF*G211.$$

Since G211 is approximately proportional to the measured glare causing light level, V206 is approximately proportional to the product of the measured glare multiplied by the time average of the reciprocal of the ambient light level. RF includes the sensitivity adjusting rheostat and is a factor in the expression for V206. Thus, the rheostat is used to scale V206 to the desired level so that −0.6 volts represents the onset of glare. When the glare causing light level is low, the resistance of the sensor R11 is high and the gain of the operational amplifier AMP203 circuit low. V206 is nearly zero volts. As the glare causing light level increases, V206 becomes increasingly negative. When V206 is about −0.6 volts, the transistor Q201 turns on pulling V208 from −2.8 volts to −1.9 volts. The mirror voltage (V209−V211) increases to about 0.45 volts and begins to reduce the reflectivity of the mirror. As glare increases further, V206 decreases toward the −2.8 volt negative supply and the operational amplifier AMP204 in conjunction with the summing resistor R214, feedback resistor R215 and emitter follower output stage Q203 increases the voltage (V209−V211) to about 1.0 volts. This drives the mirror to its minimum reflectivity.

When glare decreases, V206 becomes less negative, and the mirror voltage (V209−V211) decreases. With a large enough decrease in the mirror voltage, the charge stored in the mirror discharges through the resistor R220. The value of the resistor R220 is chosen to establish the desired clearing rate of the mirror. This rate decreases by about two to one as the resistance of the resistor R220 is increased from a low to a high value.

The shaping and drive circuit just described establishes the required relationship between V206 and the reflectivity to which the mirror is driven. The circuit closely follows the performance described in the sections on "Measurement of Glare After Partial Attenuation". In particular, this embodiment comes very close to the algorithm described in the mathematical description. The discussions on increased speed of response and on the reduced effect of errors in the establishment of the mirror element reflectivity apply.

When the back-up lights are on, the voltage at T203 causes the resistor R223 to conduct turning on the transistor Q202 and pulling the voltage V208 at the noninverting input of the operational amplifier AMP204 low. This causes the mirror drive voltage (V209–V211) to fall allowing the mirror to clear. V204 is negative and decreases in magnitude but increases in value as the ambient light level increases. At approximately one footcandle, V204 exceeds V212. The output of the comparator COMP201 turns on pulling V208 low and preventing the mirror from decreasing in reflectance.

The diodes D203 and D204 and the resistors R230, R231 and R232 are components of an optional shaping network modification. The diodes D203 and D204 are replaced by shorts when not used and the other components are open circuited when not used. The modification is used to characterize the shaping network for use with a glare causing light sensor which views light directly rather than after it has passed through the attenuating layer of the mirror. The resistor R230 makes the base of the transistor Q201 more negative turning on the transistor Q201 for smaller negative excursions of V206. For small negative excursions of V206, the diodes D203 and D204 do not conduct significantly allowing the ratio of (R231+R232) to R231 to increase the gain of the operational amplifier AMP203. As V206 becomes increasingly negative the diodes D203 and D204 conduct shunting out the resistor R232 and decreasing the gain of the operational amplifier AMP203. The combined effect of this decrease in gain for larger negative excursions of V206 and of the more sensitive threshold of the transistor Q201 is to require a greater percentage change in the glare causing light level which strikes the glare causing light sensor to drive the mirror from its full bright to its full dark state. Such an increase is required to substitute for the removal of the attenuating layer of the mirror from the light path to the glare causing light sensor.

An identification of and/or typical values for the components of the system illustrated in FIG. 11, which are described hereinabove, are as follows:

| R201 | Resistor | 110 ohm, 2 W |
| R202 | Resistor | 1K ohm potentiometer |
| R203 | Resistor | 1.8K ohm |
| R204 | Resistor | 1K ohm |
| R205 | Resistor | 1.5 M ohm |
| R206 | Resistor | 10K ohm |
| R207 | Resistor | Photocell |
| R208 | Resistor | 220K ohm |
| R209 | Resistor | 100K ohm |
| R210 | Resistor | 220K ohm |
| R211 | Resistor | Photocell |
| R212 | Resistor | 100K ohm |
| R213 | Resistor | 2 M ohm |
| R214 | Resistor | 39K ohm |
| R215 | Resistor | 12K ohm |
| R216 | Resistor | 100K ohm |
| R217 | Resistor | 82K ohm |
| R218 | Resistor | 39K ohm |
| R219 | Resistor | 10 ohm, 3 W |
| R220 | Resistor | 15 ohm |
| R221 | Resistor | 22K ohm |
| R222 | Resistor | 4.7K ohm |
| R223 | Resistor | 27K ohm |
| R224 | Resistor | 15 ohm |
| R225 | Resistor | 470K ohm |

-continued

| R230 | Resistor** | 1.5 megohm |
| R231 | Resistor** | 33K ohm |
| R232 | Resistor** | 100K ohm |
| C201 | Capacitor | 47 mfd. |
| C202 | Capacitor | 47 mfd. |
| C203 | Capacitor | .022 mfd. |
| C204 | Capacitor | 100 mfd. |
| C205 | Capacitor | 100 mfd. |
| D201 | Diode | 1N4739A |
| D202 | Diode | 1N4004 |
| D203 | Diode* | 1N4148 |
| D204 | Diode* | 1N4148 |
| Q201 | Transistor | 2N3906 |
| Q202 | Transistor | 2N3904 |
| Q203 | Transistor | TIP29 |
| COMP201 | Comparator | ½ of LM393 Dual Comparator |
| AMP201 | Operational Amplifier | ¼ LM324 |
| AMP202 | Operational Amplifier | ¼ LM324 |
| AMP203 | Operational Amplifier | ¼ LM324 |
| AMP204 | Operational Amplifier | ¼ LM324 |

*Short to delete option.
**Open to delete option.

It will be understood that these values and/or descriptions may be varied depending upon the particular application of the principles of the present invention.

Figure 14:
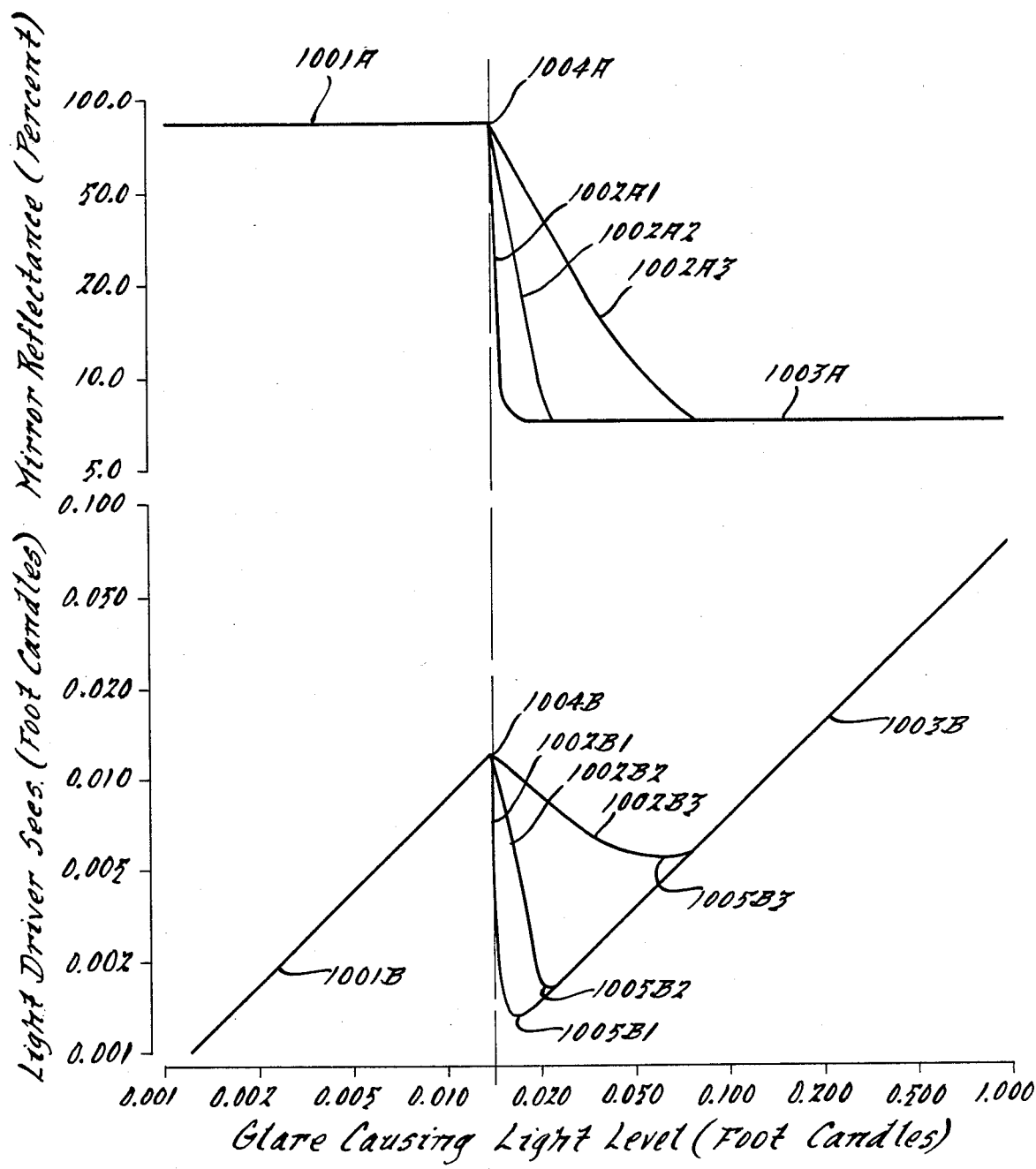
FIG. 14 is a composite of three plots of mirror reflectance and of the level of the reflected light which the driver sees.
Figure 15:
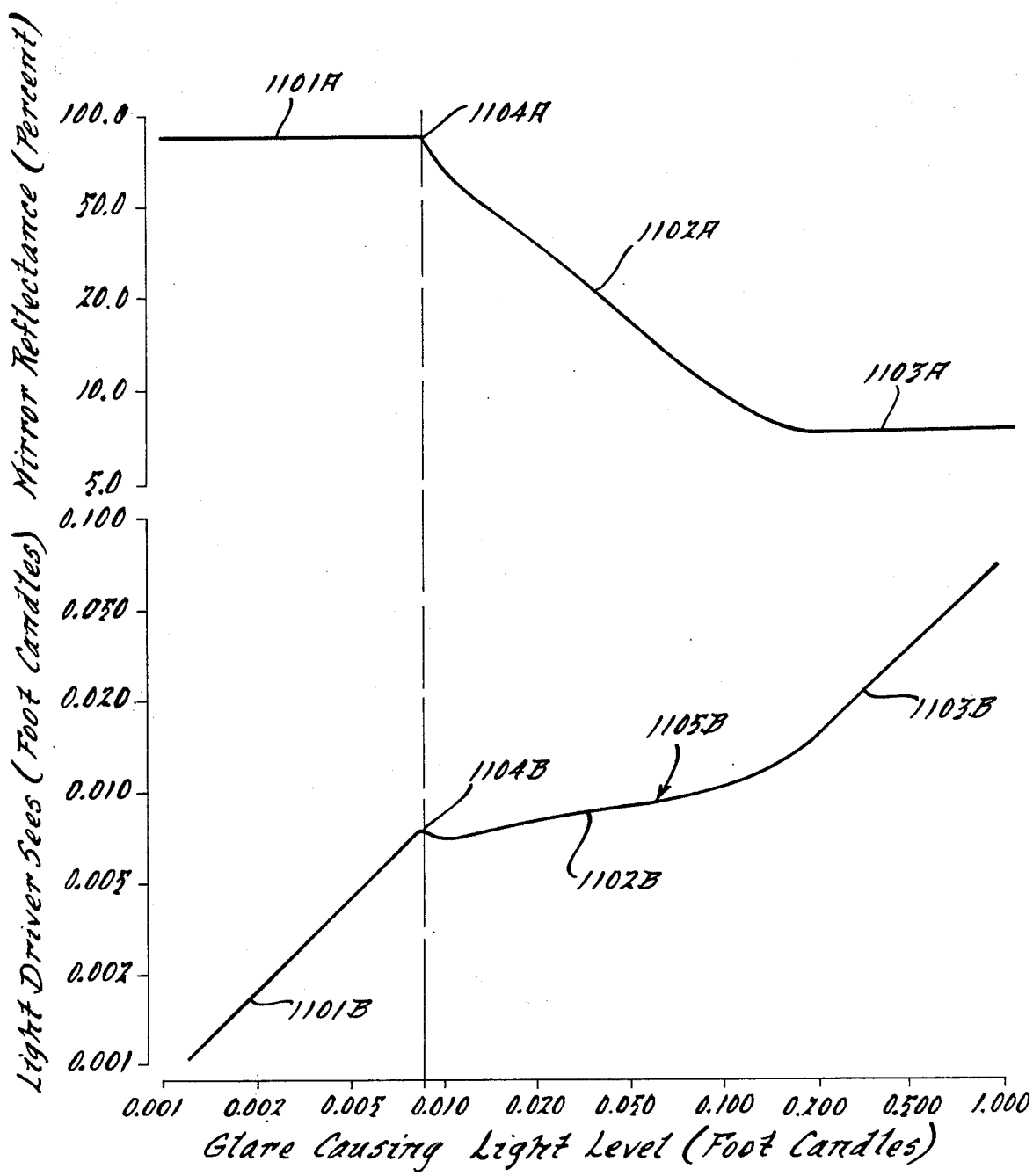
FIG. 15 is a plot similar to form in the plots of FIG. 14, mirror reflectance and the level of the reflected light which the driver sees being shown using the circuit of FIG. 11, the mirror of FIG. 1 and the through the layer sensor configuration of FIG. 5.
Figure 18:
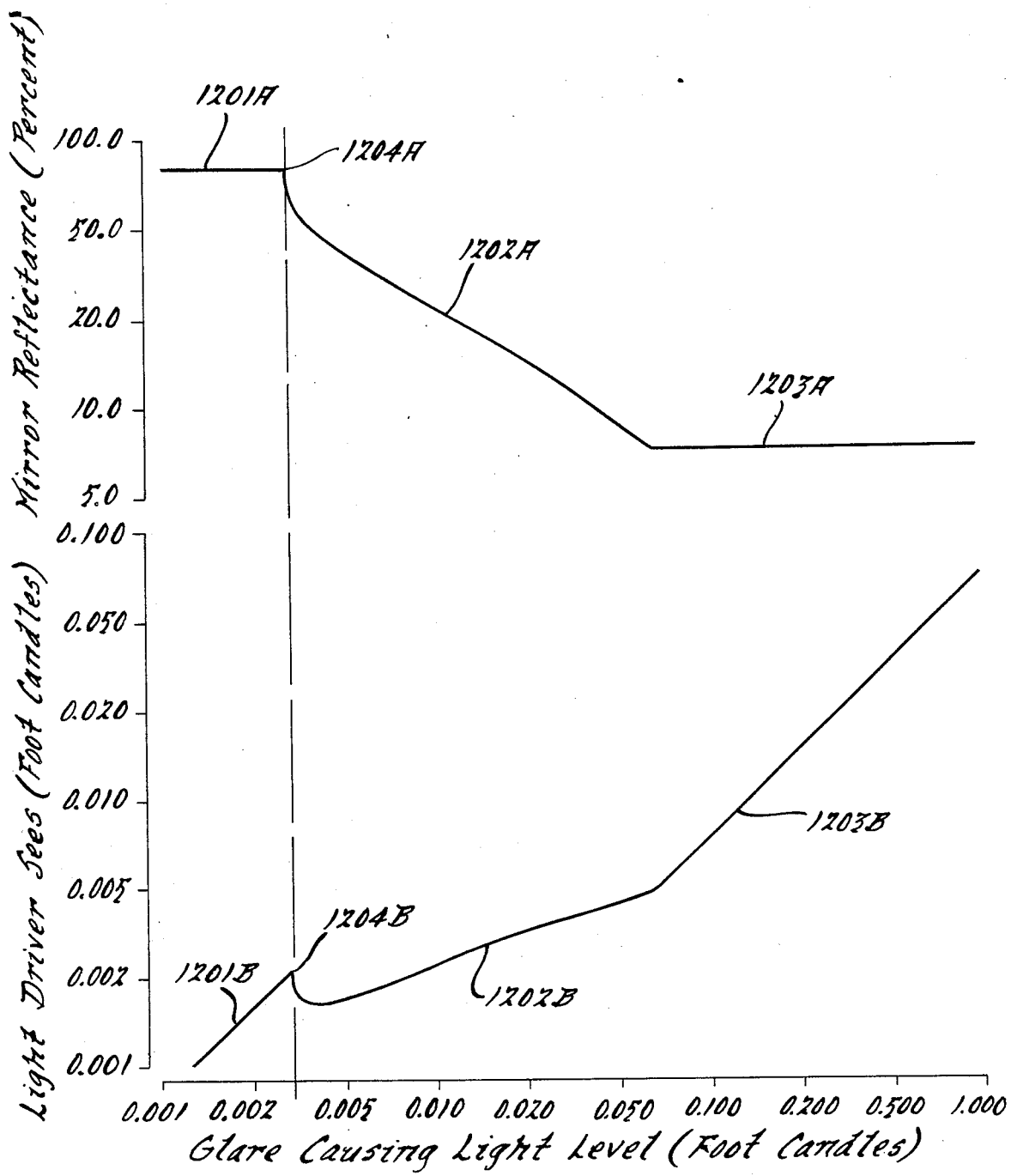

FIG. 14 is a composite of three plots of mirror reflectance and of the level of the reflected light which the driver sees. These plots as well as the ones in FIGS. 15 and 16 are taken with a constant ambient light level. If ambient light was varied, each plot would expand into a family similar to the family of plots in FIG. 13. The control circuit of FIG. 2 and the parallel plate mirror of FIG. 1 are used for each of the three plots of FIG. 14 but the glare sensor configuration is different for each as described below. The plots demonstrate a progression of improvements in mirror performance. The same mirror is used for the plots so that the constant high reflectance portion 1001A and the associated light 1001B which the driver sees is identical for each of the three plots. Likewise, the constant low reflectance portion 1003A and the associated light 1003B which the driver sees is identical for each of the three plots. The sensor configuration affects the active variable reflectance portions 1002A1, 1002A2, and 1002A3 of the three respective plots and the associated light levels 1002B1, 1002B2, and 1002B3 which the driver sees.

For reflectance plot 1002A1 and the reflected light 1002B1 that the driver sees, glare causing light which has not passed through the attenuating layer of the mirror is sensed by a single photocell. This yields the poorest performance of the three since the light level which the driver sees at 1005B1 decreases by a factor of ten relative to its level at the glare threshold point 1004B very severely limiting the driver's ability to see detail in the rearview mirror.

For reflectance plot 1002A2 and the corresponding light 1002B2 that the driver sees, glare causing light which has not passed through the attenuating layer of the mirror is sensed by a first photocell and glare causing light which has passed through the attenuating layer of the mirror is sensed by a second matched photocell which is placed electrically in parallel with the first photocell. The conductance of each photocell increases in approximate proportion to the light which strikes it and the conductance of the parallel photocells is equal to the sum of the conductances of the individual photocells, i.e. approximately equal to the summation of the light passing through the attenuating layer and the light which is not varied by the attenuating layer. A current supplied to the parallel photocell combination causes the voltage across the cells to vary in relation to their parallel conductance, i.e. to the summation of the light levels striking them. Furthermore, the control circuit serves to hold this voltage nearly constant. This prior art configuration yields very poor performance since the light level which the driver sees at 1005B2 decreases by a factor of seven and one half relative to its level at the glare threshold point 1004B severely limiting the driver's ability to see detail in the rearview mirror.

For reflectance plot 1002A3 and the corresponding light 1002B3 that the driver sees, glare causing light which has passed through the attenuating layer of the mirror, as shown in FIG. 8, is sensed by a single photocell. This yields the best performance of the three since the light level which the driver sees at 1005B3 decreases by a factor of two and one half relative to its level at the glare threshold point 1004B mildly limiting the driver's ability to see detail in the rearview mirror. Such a mirror is a clear improvement over the prior art and is generally desirable. However, the mirrors of FIGS. 15 and 16 which include shaping of the drive signal to the mirror element yield a significant further improvement in characterization of the relationship between the light which the driver sees versus glare causing light level.

FIG. 15 is a plot similar in form to the plots of FIG. 14. Mirror reflectance and the level of the reflected light which the driver sees are shown using the circuit of FIG. 11, the mirror element of FIG. 1, and the through the layer sensor configuration of FIG. 8. The circuit of FIG. 11 shapes the drive signal to the mirror element to obtain the desired reflectance versus glare causing light level characteristic. For low light levels the mirror maintains a constant high reflectance 1101A and nearly all of the light is reflected to the driver as indicated by 1101B. At 1104A the glare threshold is detected and in portion 1102A of the plot the mirror reflectance decreases with increasing glare causing light level. The corresponding light level 1102B which the driver sees increases gradually with increasing glare causing light level. At 1105B the glare causing light level has increased by a factor of ten (1000 percent) from the level at the threshold point 1104B and the light the driver sees has increased by about 40 percent. Thus in its controllable range, the mirror reflectance changes to hold the light level that the driver sees to an almost constant level. The light level the driver sees is allowed to increase moderately with increasing glare causing light level to maintain better visibility as discussed previously. This is the mirror control characteristic which the inventors consider to be nearly ideal. Other individuals may desire a different objective—for example, to hold the light that the driver sees to a constant level through the control range of the mirror. The shaping network in the circuit of FIG. 11 has enough flexibility that persons having ordinary skill in the art can make changes which will tailor the circuit for such modified objectives. At 1103A the mirror has reached it minimum reflectance value. The mirror has thus reached the end of its controllable range and the light 1103B which the driver sees must be allowed to increase.

FIG. 16 is nearly identical to FIG. 15 except that the threshold point 1204A is somewhat different than the corresponding threshold point 1104A of FIG. 15. The position of the threshold is controlled by the sensitivity setting of the mirror and is an incidental rather than a primary difference. The primary difference is that in FIG. 16, the glare causing light is sensed directly without first going through the attenuating layer of the mirror and the optional shaping network has been added to the circuit of FIG. 11. Note the greater dip in curve 1202B just to the right of threshold point 1204B. The partial feedback resulting from viewing glare causing light through the attenuating layer is the main factor which reduces the corresponding dip in curve 1102B of FIG. 15. Small adjustments in the shaping network used or a more elaborate shaping network could reduce either of these dips, but the improvement in performance from so doing would probably not be perceptible to a driver using the mirror. Because of the similarity in the plots of FIGS. 15 and 16, a detailed description will not be repeated, but two important points should be noted. First, viewing glare causing light through the attenuating layer of the mirror, although a desirable enhancement, is not necessary to achieve many of the objectives of the invention, one of which is to provide a control which maximizes the driver's ability to see while minimizing annoying or disabling glare. Secondly, the use of shaping networks is a great improvement over prior art devices and allows the flexibility to maintain a desirable mirror control characteristic under a wide variety of mirror and control circuit configurations. Without addition of the optional modified shaping network, the control characteristic 1202B would have more nearly resembled that of 1002B3 of FIG. 14.

From the foregoing, it will be appreciated by those skilled in the art that the relatively slow response of the mirror is used to prevent the abrupt and the erratic change in reflectance level which are associated with most other variable reflectance mirrors. The continuous change in the reflectivity of the mirror provides continuously variable reflectance for each of the embodiments illustrated and described herein. The multistate and the continuous "gray scale" circuits each have special refinements in the reflectance control algorithm which minimizes glare that the driver sees under various driving conditions while keeping the reflectivity of the mirror high enough to maintain good visibility. Glare is optionally sensed after attenuation in the mirror element. This improves the accuracy of the reflectance control and reduces the range of the glare causing light level signals to which the circuit must respond. It causes the two state and the three state circuits to rapidly switch between mirror drive states for certain ranges of glare causing light levels. This rapid switching of the mirror drive signal creates a continuous, pulse modulated variation in reflectance which corresponds to changes in the glare causing light level.

The present invention allows the glare causing light threshold to be increased more rapidly with increases in the ambient light reference level. In the three state control circuit, the functional relationship between the ambient light reference level and the glare causing light glare threshold level is such that doubling the average ambient light level more than doubles the glare causing light threshold for a substantial portion of the operating range for which the mirror reduces glare. This feature largely overcomes complaints respecting prior available automatic mirrors that are too sensitive in the city. With circuit modifications, this feature may also be applied to the other control circuits including the automatic two position prism mirror.

In the three state embodiment, as the ambient light level increases, there is a range of high ambient light reference levels for which the mirror still may traverse to the intermediate reflectance level but for which the mirror is prevented from assuming its minimum reflectance level. This prevents the mirror from getting too dark to see clearly in brightly lighted city driving situations.

In the three state embodiment, the ratio of the glare causing light threshold level which causes the mirror to go to its intermediate reflectance level to the glare causing light threshold level which causes the mirror to go to its minimum reflectance level is increased at the higher ambient light levels which are normally encountered in city and suburban driving situations. Thus, in areas of relatively high average ambient light level, the mirror goes to its lower visibility minimum reflectance state only when glare is extremely bright.

When additional sensor(s) are used to sense glare causing light on the outside mirror(s), these sensors with their associated circuits are made less sensitive to glare than the inside glare causing light sensor. The outside sensors still respond to glare from vehicles which are close and to the side so as to cause glare in one of the outside mirror(s) while not being detected by the inside sensor. The reduced sensitivity minimizes nuisance actuations of the mirror due to stray light pickup by the outside sensor(s).

While preferred embodiments of the invention have been illustrated and described, it will be understood that various changes and modifications may be made without departing from the spirit of the invention.

What is claimed is:

1. In an automatic rearview mirror system for automotive vehicles, the combination including an electrochromic variable reflectance member the reflectivity of which varies continuously over a range as a function of at least two electrical signal levels applied thereto, ambient light sensing means effective to sense ambient light and generate a corresponding electrical signal indicative of the ambient light level, glare sensing means effective to sense glare causing light and generate a corresponding electrical signal indicative of the glare causing light level, and means operable to apply an electrical control signal to said variable reflectance member to vary the reflectivity of said reflectance member while maintaining a high quality image during reflectance transition as a function of the sensed ambient light signal and the sensed glare causing light signal, the total response time of said control signal to changes in the electrical indicative of the glare causing light level being faster than the total response time of said electrochromic reflectance member to said control signal.

2. The combination as set forth in claim 1 wherein the speed of decreasing the reflectance of said reflectance member is faster than the speed of increasing the reflectance of said reflectance member.

3. The combination as set forth in claim 1, said system including means effective to cause said variable reflectance member to exhibit its maximum reflectivity in the event electrical power to the system is interrupted.

4. The combination as set forth in claim 1 characterized in that for a predetermined ambient light condition and for increasingly severe glare, the reflectivity of said reflectance member is reduced to hold the light level reflected to the driver at a substantially constant level through the controllable range of said reflectance member.

5. The combination as set forth in claim 1 characterized in that for a predetermined ambient light condition and for increasingly severe glare, the reflectivity of said reflectance member is altered so as to alter the light level reflected to the driver.

6. The combination as set forth in claim 1 including means preventing significant response to the electrical signal generated by said ambient light sensing means when the light detected by said ambient light sensing means is below a predetermined value.

7. The combination as set forth in claim 1 including means for short circuiting the electrical signal applied to said variable reflectance member when a high reflectance level is required.

8. The combination as set forth in claim 1 including means inhibiting reduction in the reflectance of said variable reflectance member when the vehicle is in reverse gear.

9. The combination as set forth in claim 1 including a second variable reflectance member the reflectance of which varies as a function of an electrical signal applied thereto, and means electrically connecting said variable reflectance members.

10. The combination as set forth in claim 9 one of said variable reflectance members being disposed in the interior of a vehicle, said second variable reflectance member being disposed on the exterior of said vehicle.

11. In an automatic rearview mirror system for automotive vehicles, the combination including an electrochromic mirror having at least a full reflectance mode and a partial reflectance mode and the reflectivity of which varies continuously over a range as a function of time and of an electrical control signal applied thereto, forward facing sensor means effective to detect light forwardly of the vehicle and generate a corresponding forward electrical signal indicative of the forward light level, backward facing sensor means effective to detect light rearwardly of the vehicle and generate a corresponding rearward electrical signal indicative of the rearward light level, means for applying electrical power to said system, and means operable to apply an electrical control signal to said electrochromic mirror to change the reflectance thereof over a continuous range as a function of said forward electrical signal and said rearwafd electrical signal while maintaining a high quality image during reflectance transitions between said modes, the total response time of said control signal to changes in the electrical signal indicative of the rearward light level being faster than the total response time of said electrochromic mirror to said control signal.

12. The combination as set forth in claim 11, said system including means effective to cause said electrochromic mirror to exhibit only its full reflectance mode in the event electrical power to the system is interrupted.

13. The combination as set forth in claim 11, said electrochromic mirror having a time response upon the application of an electrical control signal thereto that is slower than the time response of said rearward electrical signal and effective to average the control signal thereby establishing a range of intermediate reflectance levels.

14. The combination as set forth in claim 11 including means effective to hold said electrochromic mirror in its full reflectance mode when the light detected by said forward facing sensor means exceeds a predetermined value.

15. The combination as set forth in claim 11 including means preventing significant response to the forward electrical signal generated by said forward facing sensor means when the light detected by said forward facing sensor means is below a predetermined value.

16. The combination as set forth in claim 11 including means for short circuiting said electrochromic mirror when a high reflectance condition is required.

17. The combination as set forth in claim 11 including means inhibiting reduction in the reflectivity of said electrochromic mirror from said full reflectance mode when the vehicle is in reverse gear.

18. In an automatic rearview mirror system for automotive vehicles, the combination including an electrochromic mirror having at least a full reflectance mode and a low reflectance mode, the reflectivity of said electrochromic mirror varying as a function of time and of an electrical control signal applied to said mirror, first sensor means effective to detect light forwardly of a vehicle and generate a corresponding forward electrical signal indicative of the forward light level, second sensor means effective to detect light rearwardly of the vehicle and generate a corresponding rearward electrical signal indicative of the rearward light level, means comparing the forward electrical signal and the rearward electrical signal and operable to generate at least two electric control signal for application of an electrical potential to said electrochromic mirror to vary the reflectivity of said mirror as a function of the severity of the glare whereby said electrochromic mirror may be changed between at least a full reflectance mode and a low reflectance mode while maintaining a high quality image during reflectance transitions between said modes as a function of a comparison of the rearward electrical signal and the forward electrical signal, the total response time of said control signals to changes in the electrical signal indicative of the rearward light level being faster than the total response time of said electrochromic mirror to said control signals.

19. The combination as set forth in claim 18, said rearward electrical signal having a time response shorter than the time response of said electrochromic mirror upon the application of varying electrical control signals applied thereto.

20. The combination as set forth in claim 18 including a second electrochromic mirror, and means electrically connecting said electrochromic mirrors whereby said electrochromic mirrors change reflectivity substantially simultaneously.

21. The combination as set forth in claim 20, one of said electrochromic mirrors being disposed in the interior of the vehicle, the other of said electrochromic mirrors being disposed on the exterior of the vehicle.

22. The combination as set forth in claim 21 including means effective to maintain each of said electrochromic mirrors in its full reflectance mode when said vehicle is in reverse gear.

23. The combination as set forth in claim 18 including means for attenuating the light rearwardly of the vehicle, said second sensor being effective to detect the attenuated light.

24. In an automatic rearview mirror system for an automotive vehicle, the combination including a first electrochromic mirror having a full reflectance mode, an intermediate reflectance mode, and a low reflectance mode, the reflectivity of said mirror varying as a function of time and of an electrical control signal applied thereto, first photoelectric sensor means effective to detect light forwardly of the vehicle and generate a corresponding forward electrical signal indicative of the forward light level, second photoelectric sensor means effective to detect light rearwardly of the vehicle and generate a corresponding rearward electrical signal indicative of the rearward light level, means effective to compare said rearward electrical signal and the forward electrical signal and to change the reflectance mode of said mirror as a function of a comparison of said rearward electrical signal with said forward electrical signal as modified by the time response of said mirror upon the application of an electrical control signal thereto, the total response time of said control signal to changes in the electrical signal indicative of the rearward light level being faster than the total response time of said first electrochromic mirror to said control signal.

25. The combination as set forth in claim 24 including a second electrochromic mirror, said first electrochromic mirror being disposed in the interior of the vehicle, said second mirror being disposed on the exterior of the vehicle, and means electrically connecting said mirrors whereby changes in the reflectivity of said mirrors occurs substantially simultaneously.

26. The combination as set forth in claim 24, said system having a power supply including an intermediate reference voltage.

27. The combination as set forth in claim 24, said electrochromic mirror having at least three reflectance modes, said means effective to compare said forward electrical signal and said rearward electrical signal being effective to generate at least three electrical signal levels to change the reflectivity of said mirror to each of said reflectance modes as a function of the value of the rearward light level to establish a full, a low and at least one intermediate reflectance mode.

28. The combination as set forth in claim 25, said second electrochromic mirror having an additional photoelectric sensor means effective to detect light rearwardly of the vehicle and generate an additional rearward electrical signal indicative of the rearward light level impinging thereon.

29. The combination as set forth in claim 24, said second photoelectric sensor means being effective to detect light rearwardly of the vehicle as attenuated by said first electrochromic mirror.

30. In an automatic rearview mirror system for automotive vehicles, the combination including an electrochromic mirror having a full reflectance mode and a partial reflectance mode and the reflectivity of which varies as a function of an electrical control signal applied thereto, forward facing sensor means effective to detect light forwardly of the vehicle and generate a corresponding forward electrical signal indicative of the forward light level, backward facing sensor means effective to detect light rearwardly of the vehicle and generate a corresponding rearward electrical signal indicative of the rearward light level, means having a smoothing time averaging effect on the forward electrical signal and acting on the forward electrical signal to produce a filtered forward electrical signal independent of the rearward electrical signal, and means operable to apply an electrical control signal to said electrochromic mirror to change said electrochromic mirror between said full reflectance mode and said partial reflectance mode as a function of the output of said filtered forward electrical signal, said rearward electrical signal, and the response time of said mirror upon a change in an electrical control signal applied thereto, the total response time of said control signal to changes in the electrical signal indicative of the rearward light level being faster than the total response time of said electrochromic mirror to said control signal.

31. The combination as set forth in claim 30 including means for short circuiting said electrochromic mirror when a high reflectance condition is required.

32. The combination as set forth in claim 30 including means inhibiting reduction in the reflectivity of said electrochromic mirror from said full reflectance mode when the vehicle is in reverse gear.

33. In an automatic rearview mirror system for automotive vehicles, the combination including an electrochromic mirror having a full reflectance mode, at least one intermediate reflectance mode, and a low reflectance mode, the reflectivity of said electrochromic mirror varying as a function of an electrical control signal applied to said mirror, control circuitry including a first sensor means effective to detect light forwardly of a vehicle and generate a corresponding forward electrical signal indicative of the forward light level, said control circuitry including second sensor means effective to detect light rearwardly of the vehicle and generate a corresponding rearward electrical signal indicative of the rearward light level, said control circuitry also including means comparing the forward electrical signal and the rearward electrical signal and operable to apply an electrical potential to said electrochromic mirror to very the reflectivity of said mirror as a function of the forward electrical signal, the rearward electrical signal, and the response time of said mirror upon a change in an electrical control signal applied thereto whereby said electrochromic mirror may be changed between a full reflectance mode, intermediate reflectance modes, and a low reflectance mode as a function of a comparison of the rearward electrical signal, the forward electrical signal, and the response time of said mirror upon a change in an electrical signal applied thereto, the total response time of said control signal to changes in the electrical signal indicative of the rearward light level being faster than the total response time of said electrochromic mirror to said control signal.

34. The combination as set forth in claim 33 including a second electrochromic mirror, said control circuitry including means electrically connecting said electrochromic mirror whereby said electrochromic mirror change reflectivity substantially simultaneously upon a change in an electrical signal applied thereto.

35. The combination as set forth in claim 34, one of said electrochromic mirrors being disposed in the interior of the vehicle, the other of said electrochromic mirrors being disposed on the exterior of the vehicle.

36. The combination as set forth in claim 35 including means effective to maintain each of said electrochromic mirrors in its full reflectance mode when said vehicle is in reverse gear.

37. The combination as set forth in claim 33 including means for attenuating glare producing light rearwardly of the vehicle, said second sensor being effective to detect the attenuated light.

38. In an automatic rearview mirror system for an automotive vehicle, the combination including a first electrochromic mirror having a full reflectance mode, an intermediate reflectance mode, and a low reflectance mode, the reflectivity of said first mirror varying as a function of an electrical control signal applied thereto, first photoelectric sensor means effective to detect light forwardly of the vehicle and generate a corresponding forward electrical signal indicative of the forward light level, second photoelectrical sensor means effective to detect light rearwardly of the vehicle and generate a corresponding rearward electrical signal indicative of the rearward light level, forward sensor filtering means characterized by having a first time response and having a smoothing time averaging effect on the forward electrical signal and acting on the forward electrical signal to produce a filtered forward electrical signal independent of the rearward electrical signal, and means effective to compare said rearward electrical signal and the filtered forward electrical signal and to change the reflectance mode of said first electrochromic mirror as a function of a comparison of said filtered forward electrical signal and said rearward electrical signal and the response time of said first mirror upon a change in an electrical control signal applied thereto, the total response time of said control signal to changes in the electrical signal indicative of the rearward light level being faster than the total response time of said first electrochromic mirror to said control signal.

39. The combination as set forth in claim 38 including a second electrochromic mirror, said first electrochromic mirror being disposed in the interior of the vehicle, said second mirror being disposed on the exterior of the vehicle, and means electrically connecting said mirrors whereby changes in the reflectivity of said mirrors occur substantially simultaneously.

40. The combination as set forth in claim 39, said system having a power supply including an intermediate reference voltage.

41. The combination as set forth in claim 38, said first electrochromic mirror having at least three reflectance modes, said means effective to compare said filtered forward electrical signal and said rearward electrical signal being effective to change the reflectivity of said first electrochromic mirror to each of said reflectance modes.

42. The combination as set forth in claim 39, said second electrochromic mirror having an additional photoelectrical sensor means effective to detect light rearwardly of the vehicle and generate an additional rearward electrical signal indicative of the rearward light level impinging thereon.

43. The combination as set forth in claim 38, said second photoelectric sensor means being effective to detect light rearwardly of the vehicle as attenuated by said first electrochromic mirror.

44. In an automatic rearview mirror system for automotive vehicles, the combination including a first electrochromic mirror having at least a full reflectance mode and a partial reflectance mode and the reflectivity of which varies a function of an electrical signal applied thereto, said first electrochromic mirror being disposed in the interior of a vehicle, a second electrochromic mirror having at least a full reflectance mode and a partial reflectance mode and the reflectivity of which also varies as a function of an electrical signal applied thereto, said second electrochromic mirror being disposed on the exterior of said vehicle, first photoelectric sensor means carried by said first electrochromic mirror and effective to detect light forwardly of the vehicle and generate a corresponding forward electrical signal indicative of the forward light level, second photoelectric sensor means carried by said first electrochromic mirror and effective to detect light rearwardly of the vehicle and generate a corresponding rearward electrical signal indicative of the rearward light level, and means operable to apply an electrical control signal to each of said first and second electrochromic mirrors to change the reflectivity of each of said first and second electrochromic mirrors as a function of said forward electrical signal and said rearward electrical signal.

* * * * *